United States Patent
Jensen

(10) Patent No.: US 7,568,275 B2
(45) Date of Patent: Aug. 4, 2009

(54) APPARATUS, SYSTEMS AND METHODS FOR WORK PIECE ISOTHERMAL DRY MACHINING AND ASSEMBLY FIXTURES

(76) Inventor: Robert M. Jensen, 17813 - 212th Ave. East, Orting, WA (US) 98360

( * ) Notice: Subject to any disclaimer, the term of this patent is extended or adjusted under 35 U.S.C. 154(b) by 30 days.

(21) Appl. No.: 11/937,231

(22) Filed: Nov. 8, 2007

(65) Prior Publication Data

US 2008/0111290 A1    May 15, 2008

Related U.S. Application Data

(60) Provisional application No. 60/865,537, filed on Nov. 13, 2006.

(51) Int. Cl.
*B23Q 7/00* (2006.01)
*B25B 11/00* (2006.01)

(52) U.S. Cl. .......................... 29/559; 269/21

(58) Field of Classification Search .............. 29/559, 29/281.1, 418, 407.04, 407.05, 464, 720, 29/721, 722, 743; 409/64, 141, 135; 267/140.12; 279/2.02; 269/21
See application file for complete search history.

(56) References Cited

U.S. PATENT DOCUMENTS

| | | | |
|---|---|---|---|
| 3,618,432 A | 11/1971 | Briese | |
| 4,453,694 A | 6/1984 | Andreasson | |
| 4,530,507 A | 7/1985 | Lee, Jr. | |
| 4,640,501 A | 2/1987 | Poland | |
| 4,784,364 A | 11/1988 | Chamberlain et al. | |
| 4,909,489 A * | 3/1990 | Doi | 267/140.12 |
| 5,197,537 A | 3/1993 | Chigira et al. | |
| 5,249,785 A | 10/1993 | Nelson et al. | |
| 5,428,199 A | 6/1995 | Berger et al. | |
| 5,494,269 A | 2/1996 | McCalmont | |
| 5,543,470 A | 8/1996 | Nakata et al. | |
| 5,588,323 A | 12/1996 | Peterson | |
| 5,590,870 A | 1/1997 | Goellner | |
| 5,617,769 A | 4/1997 | Bjorck et al. | |
| 5,621,965 A | 4/1997 | Turchan | |
| 5,672,035 A | 9/1997 | Pawlik | |
| 5,680,801 A | 10/1997 | Keller | |
| 5,765,818 A | 6/1998 | Sabatino et al. | |
| 6,051,074 A | 4/2000 | Strodtbeck et al. | |
| 6,391,112 B1 | 5/2002 | Mahler et al. | |
| 6,830,415 B2 | 12/2004 | Shiba et al. | |
| 6,913,515 B2 | 7/2005 | Beaucage et al. | |
| 2008/0290613 A1 * | 11/2008 | Haimer | 279/2.02 |

* cited by examiner

*Primary Examiner*—John C Hong
(74) *Attorney, Agent, or Firm*—Jacques M. Dulin, Esq.; Innovation Law Group Ltd

(57) ABSTRACT

Isothermal work piece holding system uses vibration-damping, low thermal conductivity, low TCE polymer-composite holding body(ies) to damp machine tool vibration and chatter while accurately, rigidly maintaining the work piece in position by vacuum and/or mechanical clamps during machining. Cooling fluid channels having high thermal conductivity plates in contact with the work piece transfer thermal energy to/from it to maintain it isothermal during machining, inspection and assembly, eliminating dimensional changes and increasing process repeatability. Minimizing chatter reduces cycle time and improves surface finish which eliminates manual re-work. The system employs vacuum and coolant fluid pumps, heater/cooler(s), temperature sensor(s) and controller(s) to achieve highly accurate dimensional tolerances machining of parts which reduces error stack-up and assembly costs. Isothermal fixtures are disclosed for assembling parts and automated rivet settings in precise locations with reduced use of shims. The inventive isothermal system is applicable to control of TCE/$I^2R$ effects in linear induction motors.

20 Claims, 10 Drawing Sheets

APPARATUS, SYSTEMS AND METHODS FOR WORK PIECE ISOTHERMAL DRY MACHINING AND ASSEMBLY FIXTURES

CROSS REFERENCE TO RELATED CASE

This is the Regular U.S. Patent Application of Provisional Application Ser. No. 60/865,537 filed Nov. 13, 2006 by the same inventor and entitled Apparatus, Systems, and Methods for Isothermal, Vibration Damping, Dry Machining Work Piece Holding System, the benefit of the filing date of which is claimed under 35 USC 119 ff, and the disclosure of which is incorporated by reference herein.

FIELD

The present invention relates to holders for work pieces being machined, primarily in dry machining processes, and more specifically to apparatus, automatic control systems and methods of continuously attenuating high frequency vibrations and preventing heat build-up, in large, thin cross-section, contoured and/or complex shape or multi-part work pieces, while simultaneously maintaining the work pieces isothermally stable during a machining and/or an inspection operation. The inventive isothermal work piece holding systems reduce machining errors arising from chatter and TCE due to machining heat generation and result in high precision machining, in shorter work time at higher yield of on-spec machined parts. The inventive system is also applicable to fixtures for the assembly of precision parts in a manner that essentially eliminates TCE-induced misalignment of parts by holding them isothermally isolated during the assembly. The inventive system is also applicable to preventing TCE-induced distortions of machine frames and milling beds from linear induction motors that generate extreme quantities of heat. A magnetic locator system is also disclosed to assist in blind drilling and riveting by automated rivet machines during wing and body assembly of aerospace craft components.

BACKGROUND OF THE ART

In the high precision machine tool industry, it is vital to rapidly machine all work pieces to tight dimensional tolerances with smooth surface finish on a repeatable basis. Of particular interest is production of large, relatively thin cross section, contoured and/or complex work pieces, accurately, quickly and repeatedly. These types of work pieces are very difficult to hold rigidly, accurately and inexpensively because they are inherently susceptible to chatter. Chatter is the high frequency vibration of the work piece surface against, for example, a moving or rotating cutting tool. Chatter causes individual height differences on each pass of the tool across the work piece surface. Whenever such differences in height occur, a sharp (90°) corner is created, at each of which is concentrated static, dynamic and cyclic tensile stresses.

Stress concentrations can initiate both stress corrosion cracking and corrosion-fatigue in the presence of an atmospheric corrodent. Stress corrosion cracking is a progressive fracture mechanism in metals which is caused by simultaneous interaction of a corrodent and sustained tensile stress during service. Corrosion-induced fatigue can also cause a somewhat similar fracture mechanism which causes progressive cracking due to cyclic stress loading during service. Either fracture mechanism can lead to catastrophic failure of a work piece in normal service.

Prior attempts to reduce work piece chatter include modifications to the work piece itself, as well as re-designing cutter tool geometries, machining parameters, and work piece setups. None provide vibration damping of thin cross-section work pieces or temperature control of the work piece. Other chatter reduction approaches include use of modeling clay, non-linear metallic springs, gas and hydraulic shock absorbers, tuned resonant structures and mechanical preloading. Attempts to use elastic materials rely on partial compression of a compliant material, resulting in a lack of rigidity in supporting the work piece. Since the work piece is not held rigidly, shallower depths of cut at slower tool rotation, smaller step-over and/or slower feed rate are required to mill cleanly without producing waves or sharp shoulders in the surface finish.

Compliant or visco-elastic materials have a very low thermal conductivity and act as heat insulators, rather than as heat sinks. Since the machining process creates heat energy, some of the heat energy does transfer away from the work piece as very hot chips are ejected from the work piece. However, at best, only 75% of the heat energy is exported in the chips. The remaining heat energy is absorbed by both the tool/spindle and the work piece. Whatever remaining heat energy that does not transfer to the tool/spindle builds up in the work piece. Also, compliant materials may set up an entirely new set of oscillation frequencies in the work piece. Thus, while they may damp some vibration frequencies, they can set up a different, typically lower, vibration frequency that has a higher amplitude motion in the work piece. Where viscoelastic material is applied along the outside marginal edges of the work piece, or an insufficient amount is used, other oscillations are set up that were not present when the work piece was held without their use. Experience shows that combinations of such chatter reduction methods both lengthen cycle times and concentrate heat in the work pieces. Due to the deficiencies of such prior anti-chatter work piece holding methods, significant quantities of reject work pieces are created, requiring costly, manual rework with poor results.

Both chatter and thermal build-up are exacerbated in "dry" machining where no coolant or lubricant is used. The aerospace industry dry machines work pieces because they are too large to machine "wet". Most long aerospace work pieces are dry machined from aluminum because of the size of the part ranges in length from 50 to 112 feet long. Aluminum has high Thermal Conductivity and Thermal Coefficient of Expansion (TCE or CTE). A large, thin, contoured, asymmetrical work piece of aluminum is in real life a dimensional moving target during machining. Expansion and contraction rates can vary dramatically from one work piece to the next.

Recent precision specifications issued domestic and foreign aero-space companies have dictate that the thickness of these long, thin, contoured-surface work pieces must be made to extremely tight tolerances. These new specifications require that the thickness of each individual work piece be measured at many representative points to high accuracy tolerances of ±0.003". These measurements and locations must be recorded in order to meet contractual requirements. This new specification presents a two fold problem: First, the machine tool itself must be much more accurate and repeatable. Second, TCE-driven thickness changes of the work piece must be controlled to stay within overall dimensional tolerance. At present, this new quality specification is unmet by original equipment manufacturing (OEM) vendors of structural frame components.

Even after the inspected work piece is hung vertically between operations, it warms up to the ambient temperature. If a 50' work piece is machined at 50° F., when taken off of the machine bed, it warms up, e.g., to 68°±1° F., the total end-to-end TCE-driven expansion is approximately +0.140 inches.

Any dimensional feature that was initially in the center of the ±0.030" tolerance window but is located more than 150" (12.5') from the reference end will have expanded beyond the allowable distance from the end. The work piece that was acceptable when cool has thermally expanded into a low-quality non-sellable reject, and must be reworked or scrapped. These issues are exacerbated by the aircraft industry's adoption of higher strength, Alcoa 7075-B alloy, since chatter problems may make the most efficient machining of the high strength Al alloy slower, while machining, heat-induced TCE would make precision impossible.

Thus, there remains a severe, urgent, un-met need in the art to provide a solution to the serious and costly problems of dry cutter friction driving TCE-induced expansion of the work piece, and cutter/work piece interaction chatter that results in work-piece surface finish irregularities and off-specification dimensional errors. There is also a need for an adaptable system for a wide variety of machining operations on work pieces of complex shapes, large sizes and thin cross-sections, yet is simple to install and operate, is relatively inexpensive, can be retrofit on to previously installed large machine tools, and can be used to produce high quality dry-machined parts, in shorter run time and at greater yield, particularly in the aerospace industry.

THE INVENTION

Summary, Including Objects and Advantages

The invention is directed to isothermal, high frequency vibration damping, work piece holding and assembly fixture apparatus, control systems and methods of operation, particularly dry machining of large work pieces whose dimensional accuracy meet stringent specifications.

In the work piece holding application, the inventive system is used primarily in dry machining to substantially and significantly reduce work piece chatter, and reduce TCE errors by maintaining the work piece at a pre-selected substantially isothermal temperature. More specifically, the invention relates to apparatus, automatic control systems and methods of continuously attenuating high frequency vibrations and preventing heat build-up, in large, thin cross-section, contoured and/or complex shape or multi-part work pieces, while simultaneously maintaining the work pieces isothermally stable during machining, inspection and/or assembly operations. The inventive isothermal work piece holding/assembly fixture systems reduce machining or/and assembly errors arising from chatter and TCE due to machining heat generation and result in high precision machining, in shorter work time throughput at higher yield of on-spec machined parts. The invention is particularly useful in dry machining of large parts used in the aero-space industry, including large or small civilian, commercial and military air and space craft.

The inventive system comprises the following:
- A Work Piece Holding Body, comprising: a rigid, non-visco-elastic, and substantially non-compressible, non-malleable, electrically non-conductive material having excellent high frequency vibration damping and ultra low thermal conductivity properties, as a rigid, accurate dimensional support for a work piece, a substantial portion of which holding body is held in intimate contact with at least one surface (herein "the Stabilized Surface") of the work piece;
- A Clamping System comprising: a plurality of mechanical clamps, or preferably, a Vacuum Clamping System, comprising: vacuum conduits formed or emplaced in the work holding body, and suitable seals, manifolds and piping to one or more vacuum pumps for drawing down and maintaining the Stabilized Surface of the work piece into intimate contact with the work holding body, and including appropriate valves, gauges and sensors for monitoring and controlling the vacuum system during set up, operation and shut down;
- An Isothermal Cooling/Heating System, comprising: conduits, channels or grooves formed or emplaced in the work holding body, or in association with the surface of the work holding body that is in contact with the Stabilized Surface of the work piece, and suitable seals, manifolds and piping to one or more heating or refrigeration units for use with a non-corrosive fluid coolant for maintaining the entire work piece truly isothermal during machining, and including appropriate valves, gauges, and temperature sensors for maintaining and controlling the Isothermal Sys-tem during set up, operation and shut down; and
- A Controller System, comprising: a programmable controller unit, an operator console including data and command input and a display, various input and output leads, operating software, a communications module for remote monitoring and operational control, a recording device with memory, together functioning to implement the operation and control of the entire system.
- Optionally the system can include: one or more Auxiliary Heat Transfer Plates, comprising a highly thermally conductive, formable material disposed intermediate to the work piece Stabilized Surface and the holding body; the heat transfer plate(s) may include seals and conduit or groove connections to one or more of the vacuum system and the cooling system, and sensors embedded in or secured to the heat transfer plates to monitor performance during operation.

The inventive work piece holding bodies permit precise, rigid, dimensional structural support of work pieces held in position at any angle from vertical to horizontal. The holding body is disposed in intimate surface contact with at least one Stabilized Surface of the work piece. The work piece is held securely in place on the holding body by vacuum. That is, the vacuum system effectively functions as a "full surface clamp system" that holds the work piece uniformly over the entire area of the work piece, but from the non-worked side. Instead of having spaced clamps that provide non-uniform, essentially point pressure on the work piece as in the prior art, the inventive vacuum holder assembly holds the entire piece over its entire surface against the work holding body. Instead of point holding or pinching, the inventive system provides extended surface holding by suction.

The work holding body covers a substantial majority of at least one face of the work piece to create a Stabilized Surface. The holding body is preferably a substantially continuous surface, contoured as needed to maintain the intimate surface contact with the work piece. Different work pieces may have dedicated holding bodies, that is, holding bodies specially contoured for a particular work piece, that are maintained in inventory in the machining facility for emplacement on the machine tool bed as needed.

In an important alternative, the holding body may be made modular with one or more extensions, providing accommodations for work pieces of different sizes, contours and/or shapes. By means of this modular system, a limited menu of inventoried work holder bodies can be mixed and matched to provide a wide range of surface coverage for a full suite of work pieces.

The holding body is electrically non-conductive, is formable (e.g., by casting), has a very low thermal conductivity, and is provided as a relatively large thermal mass as compared to the mass of the work piece being machined. Seal grooves fitted with seals, e.g. O-rings, of appropriate outline configuration, e.g. cylindrical, are provided in the holding body(ies) and body extension(s) or in heat transfer plates to define in the surface of the holding body and or the plates, both vacuum and liquid coolant ports, grooves and conduits. Typically, the grooves are semicircular or slightly more (and open C-shape) to retain the O-ring or other type visco-elastic seal members that are press-fit into the seal grooves.

A plurality of vacuum conduits in communication with the ports or grooves are provided or emplaced in the holding body or heat transfer plates to allow evacuation of atmosphere from under the work piece, In addition, the system includes at least one vacuum pump to withdraw atmosphere out from under the work piece via the vacuum conduits and vacuum transfer lines. The seals compress to permit the work piece to be drawn down into contact with the mating surface of the holding body, thereby providing the full surface clamping of the Stabilized Surface. A plurality of exposed grooves, channels or conduits formed in the face of the holding body permit a coolant fluid to be circulated in intimate thermal contact with the work piece via the heat transfer plates. The combination of the full surface vacuum clamp and the isothermal cooling, both on the non-working side of the work piece create the Stabilized Surface.

However, it should be understood that the inventive system can be used with a mix of vacuum clamping and mechanical clamps, or the isothermal cooling system and holding body can be used in conjunction with a mechanical clamping system only. Where mechanical clamping is used, a plurality of mechanical clamping elements are arrayed in association with the work piece for mechanically maintaining intimate thermal contact between a work piece and the heat transfer plate and the holding body, the clamps being arrayed as needed to provide good coverage of the work piece.

The heat transfer plate(s) provided in, on, or in association with, the face of the holding body function to transfer heat energy from the workpiece to the circulating coolant fluid. As in the case of the vacuum ports or grooves, the coolant system includes suitable flexible resilient seals, preferably disposed in grooves in the holding body, or conversely in the heat transfer plate, to seal off and confine the coolant liquid inside the coolant grooves and conduits.

Preferably, the heat transfer plates are confined to the area of the coolant grooves in the face of the holding body, so that the Stabilized Surface of the work piece "sees" on the mating surface of the holding body a series, pattern, or array of heat transfer plates, beneath which are the coolant grooves. The heat transfer plates seal up the coolant grooves, so that the coolant contacts the underside of the heat transfer plates rather than being in direct contact with the work piece.

The Isothermal System comprises: a high thermal conductivity fluid which flows through the fluid conduits that functions to transfer heat energy out of the work piece to the fluid heater/chiller, or the reverse, to transfer heat from the fluid heater/chiller to the work piece; a liquid pump to transfer the high thermal conductivity fluid from the heater/chiller unit through liquid transfer lines to the work holding body; a set of liquid transfer lines to facilitate fluid transfer.

The Control System includes: at least one temperature sensing device to measure the direct temperature of the work piece itself to provide feedback used to calculate the degree of heating or cooling required for the high thermal conductivity fluid to maintain the work piece isothermal to within about ±0.5-1.0° F., and a Model Predictive Controller (MPC) to calculate and control the amount of heating/cooling needed to maintain the workpiece at an isothermal temperature. Suitable operator consoles with various inputs and outputs is provided as needed, e.g., display panels, keyboard, mouse, touch point screen, data recorders, magnetic storage and communication systems for monitoring, reporting, archiving and controlling the system to and from one or more remote sites.

Accordingly, taken in combination of its elements and features, the inventive isothermal work holding system is fully compatible with current machine tool operations. It does not require expensive changes to the installed machine tool infrastructure or the skill sets of operators, yet provides substantially increased production and higher yield. In addition, it is compatibly scalable, both in size and to use with modern high speed tooling cutters. Rather than restricted to below 10,000 rpm, the inventive system satisfies the increased performance requirements of high speed machining, permitting operation at cutter speeds of up to on the order of 30,000 rpm.

In a first preferred embodiment of the inventive system apparatus, the work piece is rigidly held in precise position against the work holding body by vacuum, by mechanical clamps or a combination of vacuum and mechanical clamps. This precise positioning and rigid securement ensures an accurate depth of cut into the work piece.

The preferred holding body material is a castable, fine grained, polymer composite composition including (in dry form): a) a base having cementitious properties, such as a Portland cement, a pozzolanic ash, or/and the like; b) fillers such as one or more aggregate(s), fibers and/or the like; and c) one or more polymer binders. Various other additives, such as colorants, plasticizers, accelerants, retardants, reinforcing fibers and/or the like may be used in the mix. The composition is mixed at room temperature with water, cast in a mold in which it sets into a rigid body. The molds can be specially configured for individual work pieces, or can be basic "blocks" that are then finish-ground to dimension and contours, including coolant grooves, threaded insets, and the like, as needed. A preferred polymer composite, known as "polymer concrete", has the required property (for the inventive system) of quickly absorbing tool-induced high frequency vibrations via the work piece Stabilized Surface. Each polymer composite holding body is a true "vibration absorbing dead body", unlike metal which has a slow response to vibration attenuation as well as being a conduit for internal propagation of vibration and reflective echoing within the metal body itself. The polymer composite materials used in the inventive system do not "ring" like metal (steel, cast iron, aluminum, etc.) or glass. Together, the castability and machinability of the polymer composite bodies result in accurate and smooth machined dimensions for highly precise contour mating to work pieces. Castable polymer composite materials suitable for the inventive holding bodies include commercially available polymer composites, such as Anocast brand polymer composite from ITW Polymer Castings Inc., which includes high strength epoxy resin, quartz aggregate and selected additives.

The high efficiency heat transfer plates, Cu or Al alloys being preferred, are pushed up against the Stabilized Surface of the work piece for intimate thermal contact. Fins may be disposed on the bottom side of the heat transfer plate. The fins are sized and configured to fit within the coolant grooves in the face of the holding body. O-rings or other sealing elements are disposed in the edges of the grooves or channels to maintain a seal so that the coolant does not leak into contact with the work piece. It should be understood that where the term "coolant" or "cooling" is used, the fluid can either heat or cool the work piece as needed.

The coolant fluid flow is preferably controlled at a constant rate, but can vary as tools progressively dull or if different tools are used during different stages of machining and produce different heat output. If during the machining cycle, the controller temperature sensor measures a temperature increase, the MPC will initiate the heater/cooler to start cooling the heat transfer fluid. As this cool fluid circulates below the heat transfer plates, they become colder. As machining heat energy raises the temperature of the work piece, a temperature gradient begins to widen. As the gradient widens, the heat energy transfers from the warmer location on the work piece to the cooler heat transfer plates. The heat energy continues to transfer from the plates to the cooler fluid which is pumped through the grooves and thence via the fluid transfer lines to the heater/cooler where the heat energy is transferred to the ambient atmosphere or other heat sink (e.g., a cooling tower). As the temperature gradient widens, the MPC progressively calls for a lower and lower coolant fluid temperature which further speeds up heat energy transfer. This process continues until an equilibrium is reached, in which the heat from machining is transferred as fast as it is generated to maintain the work piece temperature as close to a pre-selected datum, e.g. 68° F., as is possible. Thus, the inventive system maintains the work piece isothermal over a wide range of different sizes and configurations of work pieces, cutters, speeds, feeds and depth of cut machining, and various other types of machining operations.

The inventive isothermal work piece holding system and method results in the creation of a smooth surface finish on the work piece that does not require subsequent manual rework and the associated production costs. Eliminating manual rework eliminates mandatory re-inspection and its associated production costs. The inventive isothermal work piece holding system provides continuous support along the backside of work piece which holds thin cross section work pieces rigidly and thus very accurately during machining. Thus, very precise control of the thickness of the work piece can be achieved.

As a result, the inventive system permits the machine to take deeper depths of cut at faster speeds thereby reducing both cycle times and costs. By increasing rigidity and accuracy, the inventive system also enhances work piece dimensional accuracy and overall repeatability of the machining operation. This increases individual work piece quality and multi-same-piece run consistency. The inventive isothermal, work piece holding system allows machining the work piece to meet or exceed dimensional tolerance every time. Another advantage of the invention is that it is the most effective method to cut production costs and is the most reliable path to providing the lowest possible cost production method.

Another advantage of the invention is that it maintains the temperature of the work piece constant (isothermal) during machining. This prevents thermally induced TCE variations, arising from all possible sources, from affecting the work piece, pushing it outside the limits of permitted dimensional tolerance(s). The invention is straight forward, in that it fits within the currently in-place machine tool industry without complex, special order, unavailable components. One skilled in this art can readily understand that the components of the inventive system have been individually proven in the context of other uses, and are commercially available. In addition, the cost of assembling, installing and operating the inventive system is minimal compared to the cost of a large expensive reject work piece.

The inventive system is effectively immediately operational upon installation. Upon start up of machining of a new design or new configuration of work piece, there is an initial self- "tuning period" of the inventive system. In this tuning period, a single, temporary temperature rise of 3-5° F. above the desired isothermal baseline temperature of the work piece is allowed to occur so that the controller can quantify and map the thermal response of this type of work piece for the particular machining process that is being done on it. Since the initial cuts are for roughing out the piece, accompanying TCE changes in work piece dimensions are not significant or relevant to the follow-on precision stages of machining.

Once the configuration is tuned through a single work piece, it is not necessary to subject subsequent similar or identical work pieces to each go through an initial tuning step. The MPC's CPU receives thermal profile data as the cutting progresses and this data is used to map the thermal response, the results of which are one of the inputs to the MPC database and applications program algorithm that controls the coolant system operation, e.g., pump cycling and coolant fluid volumetric flow to maintain the work piece at isothermal conditions. Thereafter, in normal operation, the controller of the inventive system continuously adapts to all changes required to maintain the work piece temperature, such as when the cutters progressively become dull. This self-tuning process does not interrupt production, so productivity is increased.

Although the description below relates by way of example to a 3-axis machine, it should be understood that the inventive system is easily adapted to a 5-axis system in which the work piece can be rotated in at least 2 axes. In addition, while the inventive system is described, by example, as utilizing a single temperature sensor touching the work piece for direct temperature measurement with its signal being sent to the controller as fully representative of the thermal profile of the entire work piece (a single temperature in-put permits use of a simple control system), multiple temperature sensors, or sensors other than contact resistive temperature devices (RTD) or thermocouples, can be used, and may be preferred for some work piece configurations.

Another advantage of the invention is that it is readily extendible to three dimensions and any group of holding body shapes that may be necessary or desired to hold similar work pieces. The inventive system can be quickly constructed in days, instead of the multiple-week lead-time currently required to construct large, complex aluminum or steel fixtures as work holders for large parts. Another advantage is that the cutter tooling will last longer since the sharp edges of the tools are not being battered by exposure to constant chatter. All the advantages of the inventive system cumulatively eliminate the need for manually reworking an unacceptable (reject) work piece back into surface finish specification and elimination of an additional, re-inspection step. Further objects and advantages of this invention will become apparent from a consideration of the drawings and related description.

Thus, in contrast to the prior art, the inventive system employs a work holder of polymer concrete which provides faster forming of complex shapes to conform precisely to a wide variety of work piece shapes, provides precise rigid support of the work piece over large areas, uses a circulating fluid in the work holder to heat or cool the high efficiency heat transfer plates in contact with the work piece via conduction, the work piece can be held rigidly in place for machining either by an array of spaced mechanical clamps or, preferably, by a full Stabilized Surface vacuum suction system, and a single contact-type conduction temperature sensor can be used to accurately measure the temperature of the work piece directly, thereby simplifying the isothermal cooling/heating control system operation.

The inventive isothermal work holding system is also applicable to isothermal fixtures for assembly of precision aerospace components. In this application, holding bodies specially configured to hold individual elements in precise location with respect to each other (fixtures) for drilling, riveting, gluing, welding and the like are provided in a fixture assembly, using both the special isothermal conduits and vacuum clamping features disclosed above.

The inventive isothermal system is also applicable to providing inserts, retaining blocks, for magnets of linear induction motors used in large gantry-type milling machines, in both the permanent magnets and the electromagnets in the stationary machine bed and/or in the traveling gantries. The cooling conduits and heat transfer plates in combination with coolant fluid circulation systems, pumps and controllers efficiently withdraw the heat energy developed by the magnets, preventing heat from migrating through the machine frame, to the reference datum surfaces and thence to the work pieces.

To address the problem of TCE changes affecting drilling blind holes from the outside surface of an aerospace component such as a wing skin into structural supporting stringers, spars, etc, a magnetic locator system is disclosed that permits automated robotic riveting machines to accurately locate the centerlines of the stringers, spars and other components, so that adjustment can be made on the fly to pre-set drilling patterns to compensate for TCE driven expansion or contraction of parts during assembly.

It will be evident to those of skill in this art that the inventive system and methods easily can be adapted to a wide range of specific applications, all of which are intended to be encompassed within the scope of this invention.

BRIEF DESCRIPTION OF THE DRAWINGS

The objects, features, and advantages of the present invention will become more fully appreciated as it becomes better understood when considered in conjunction with the accompanying drawings, in which like reference characters designate the same or similar parts throughout the several views, and wherein.

DETAILED DESCRIPTION OF THE PRESENTLY-KNOWN BEST MODE(S) OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention. In particular, the invention is shown in several embodiments, each being exemplary best mode applications of the inventive system and method as applied to a specific machining task or type of operation.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Accordingly, the best mode embodiment of one feature may be shown in one drawing, and the best mode of another feature will be called out in another drawing.

FIRST EMBODIMENT, MACHINING FLAT AND COMPLEX WORK PIECES

Figure 1A:
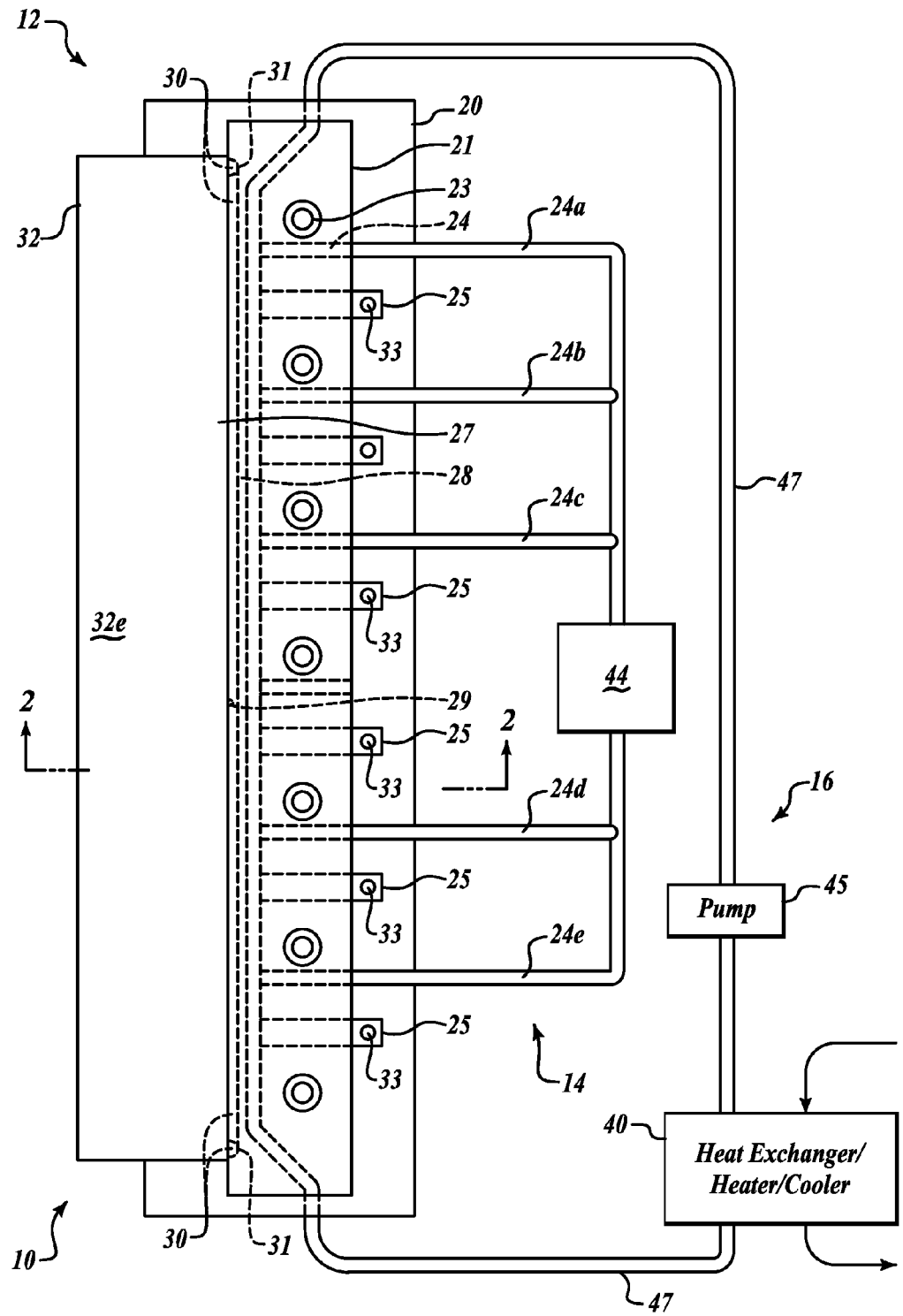
FIG. 1A is a top, plan view of a work piece holder according to one embodiment of the present invention showing a work piece held vertically.
Figure 1B:
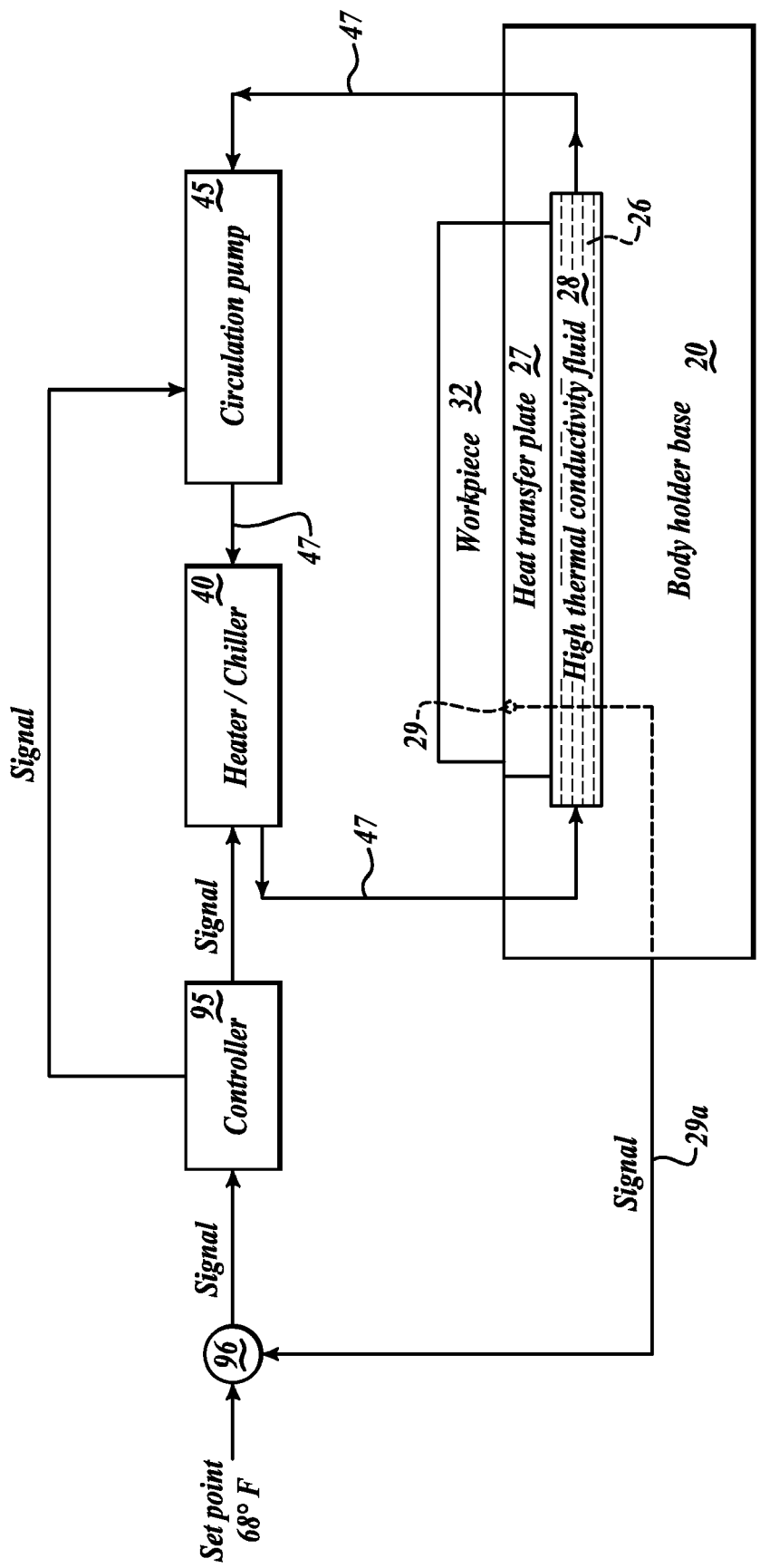
FIG. 1B is a schematic of an exemplary control system for the inventive work piece holding and assembly systems, in this example, a negative feedback temperature control loop.
Figure 2:
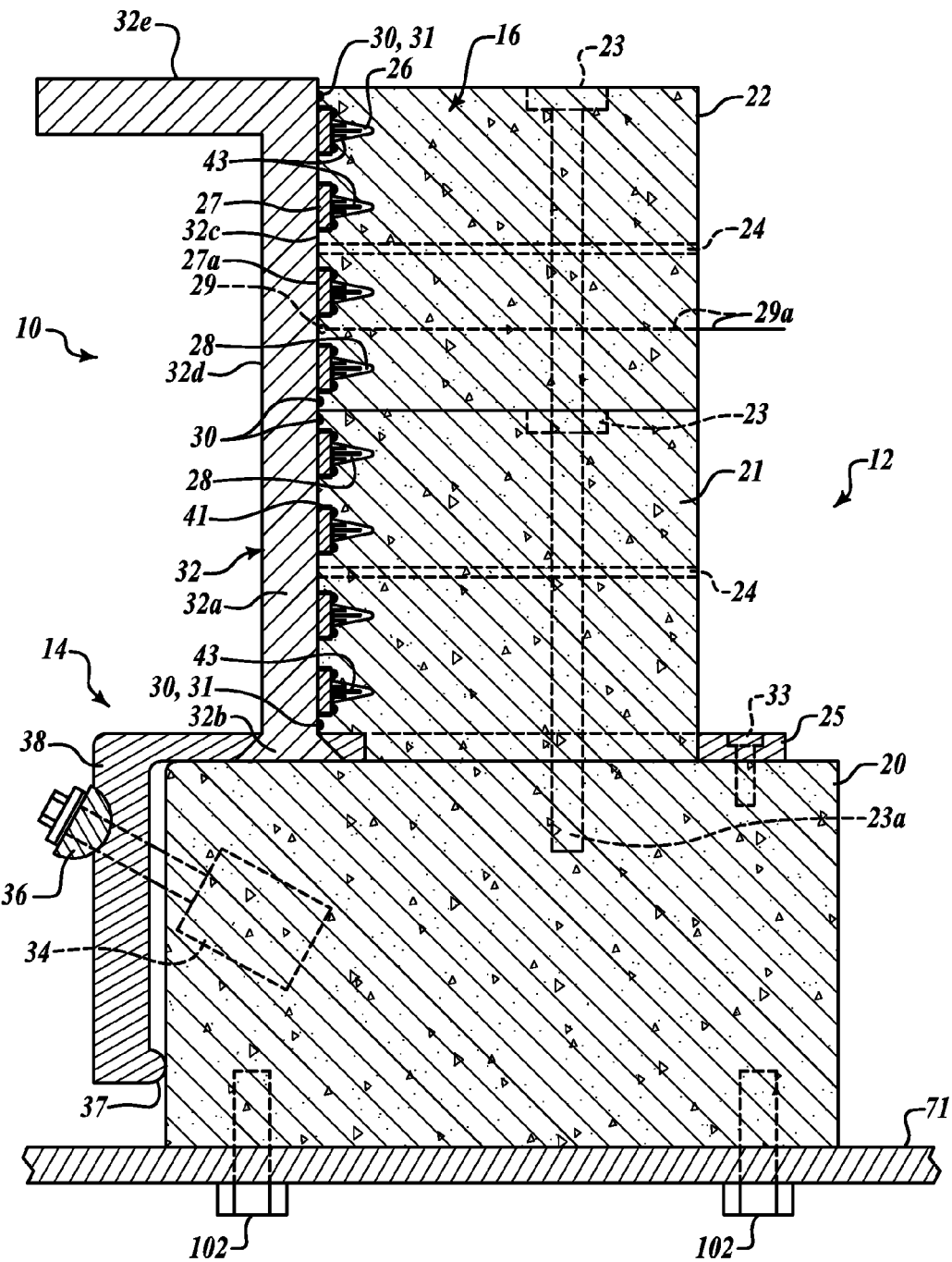
FIG. 2 is a vertical elevation section view of the inventive holder of FIG. 1A along lines 2-2 showing a vertical holder body, work piece, thermal energy transfer elements, internal vacuum lines and clamping elements.

FIGS. 1A, 1B and 2 show the inventive work piece holding system apparatus 10 holding an inverted L-shaped work piece 32 in a vertical orientation for machining (milling machine and tooling cutter are not shown). The inventive system includes holding body assembly 12, vacuum/mechanical clamping system 14 and closed loop thermal control system 16.

The holding body assembly 12 includes base body 20 disposed to rest on and be secured to a movable or stationary bed of a milling machine 71 by bolts 102 with the work piece 32 standing on its leg portion 32a by its dove-tail end 32b. End 32b is retained by dove-tail clamp 25 secured to the base body by bolt 33. The holding body 21 and body extension 22 are matingly aligned one above the other and abut against face 32c of the leg portion 32b. Depending on the configuration of the work piece, the extension may be in multiple pieces, with the body being 20, while both 21 and 22 are extensions. The body 21 and body extension 22 have a plurality of integral countersunk through-holes 23 which accommodate hold down bolts (not shown for clarity) for anchoring into threaded inserts 23a cast or emplaced in the base body member 20.

Together, base body, body and extensions securely and rigidly hold the inverted L-shaped work piece 32 in the vertical orientation.

The holding body 21 and extension 22 hold the leg 32a by a vacuum or/and mechanical clamping system 14. The vacuum clamping is implemented via a plurality of vacuum conduits 24 integral to both bodies. A plurality of seal grooves 31, generally semi-circular in cross-section, are machined or emplaced integral in the bodies 21, 22 adjacent the marginal edges and contain resilient seal members 30. These seals 30, 31 form a perimeter around a plurality of heat transfer plates 27. Working together, resilient cylindrical seals 30, cylindrical seal grooves 31, vacuum conduits 24 and vacuum manifold assembly 24a, 24b, 24c, 24d, and 24e allow the vacuum pump 44 to evacuate the air from the back side of the work piece 32. Clamping bar 25 also helps hold the work piece 32 in place. Thus, a plurality of vacuum and mechanical clamping elements are located along at least one face of the horizontal length of the work piece 32.

The closed loop isothermal assembly comprises a plurality of fluid grooves, channels or conduits 26 in the body 21 and extension 22. These fluid channels, shown by way of example as V-shaped grooves, are arranged in horizontal, parallel, spaced-apart orientation. The open face of each groove is closed with a heat conduction or heat transfer plate 27, the outer face of which, 27a, is maintained in intimate, mating contact with the work piece face 32c by fluid pressure and vacuum clamping. Heat transfer plates 27 may include one or more fins 43 that project into the groove to assist in heat transfer. A high thermal conductivity fluid 28 is circulated through each of the fluid conduits 26, all thermal radiator elements 43 and all heat transfer plates 27. The liquid transfer lines 47 and the circulation pump 45 form a closed loop liquid circulation circuit that moves the fluid 28 continuously through the heater/chiller 40 to thermally heat or cool the fluid 28 to maintain the work piece 32 at an isothermal temperature. The actual real time temperature of the work piece is monitored by a temperature sensing device 29 (sensor) which sends an input signal to the temperature controller junction 96 of the controller 95 (see FIG. 1B).

Together, the vacuum clamping system and the closed loop heating/cooling system rigidly and isothermally stabilize the work piece; the face 32c is called the Stabilized Surface. The opposite face, 32d is the working face, milled by the tool. This fixture is what is known in the industry as a "single load" fixture. Once the work piece is loaded, all milling operations are performed in sequential operations on multiple faces of the same work piece in that position. Thus, the face 32d is milled about ⅓ down from the 90 degree top corner. The small face 32e or far edge perpendicular to 32c is also milled.

FIG. 1B is a schematic block diagram of an exemplary control system for both the inventive work piece holding system during machining and during an assembly process. In this example, FIG. 1B outlines a negative feedback process control loop consisting of a desired temperature Set Point as indicated by an arrow on the left hand side, 68° F., by way of example. A summing junction 96 that outputs a signal representative of the difference between the set point temperature and the work piece temperature signal from sensing device 29 via line 29b. This temperature difference signal output is sent to the input of the model predictive controller 95, which processes and sends a modulating control signal to the heater/chiller 40. The heater/chiller 40 either heats or cools the high thermal conductivity fluid 28 which flows via the circulation pump 45 through the fluid conduits 47 to and from the conduits 26 in the work piece body 20. The heat transfer plates 27 contact the work piece to keep it isothermal. The temperature sensing device 29 sends a signal along leads 29a back to the summing junction 96. The vacuum lines to retain the work piece 32 in position for machining are not shown for clarity. The controller also sends appropriate on/off/pumping rate signals to the pump 45. As the temperature and Set Point bias signals continue to be received, the MPC 95 continues to modulate the signal to the heater/chiller 40 and pump 45 to maintain the temperature of the work piece 32 as close to isothermal as possible. Of course, one skilled in the controls art will recognize that it is a straight-forward matter to apply any one of a number of commercially available control systems to the inventive system, and that such control systems are easily configured, or others designed, for this specific application.

FIG. 2 is a vertical section view of the apparatus of FIG. 1, showing the body 20 and body extension 21 holding the work piece 32 in the vertical orientation. Only a single set of clamping elements is shown by way of illustration. A dovetail clamping block 25 (back side block) is held by bolt 33 at the appropriate position against the back side of the face of the dovetail 32b. Cylinder 34, in base body 20, extends or retracts a shaft 35 which moves a spherical joint 36. These elements rotate a front side dovetail clamping bracket 38 about rounded pivot boss 37 against the outside face of the dovetail 32b to complete the clamping from the front side (left in FIG. 2). The body 21 has a plurality of counter-sunk through-holes 23 which allow hold-down bolts (not shown for clarity) for anchoring to the base body holder 20. Also shown is temperature sensing device 29 (disposed in groove 29a) which measures the temperature of the work piece 32.

Operation

Figure 3:
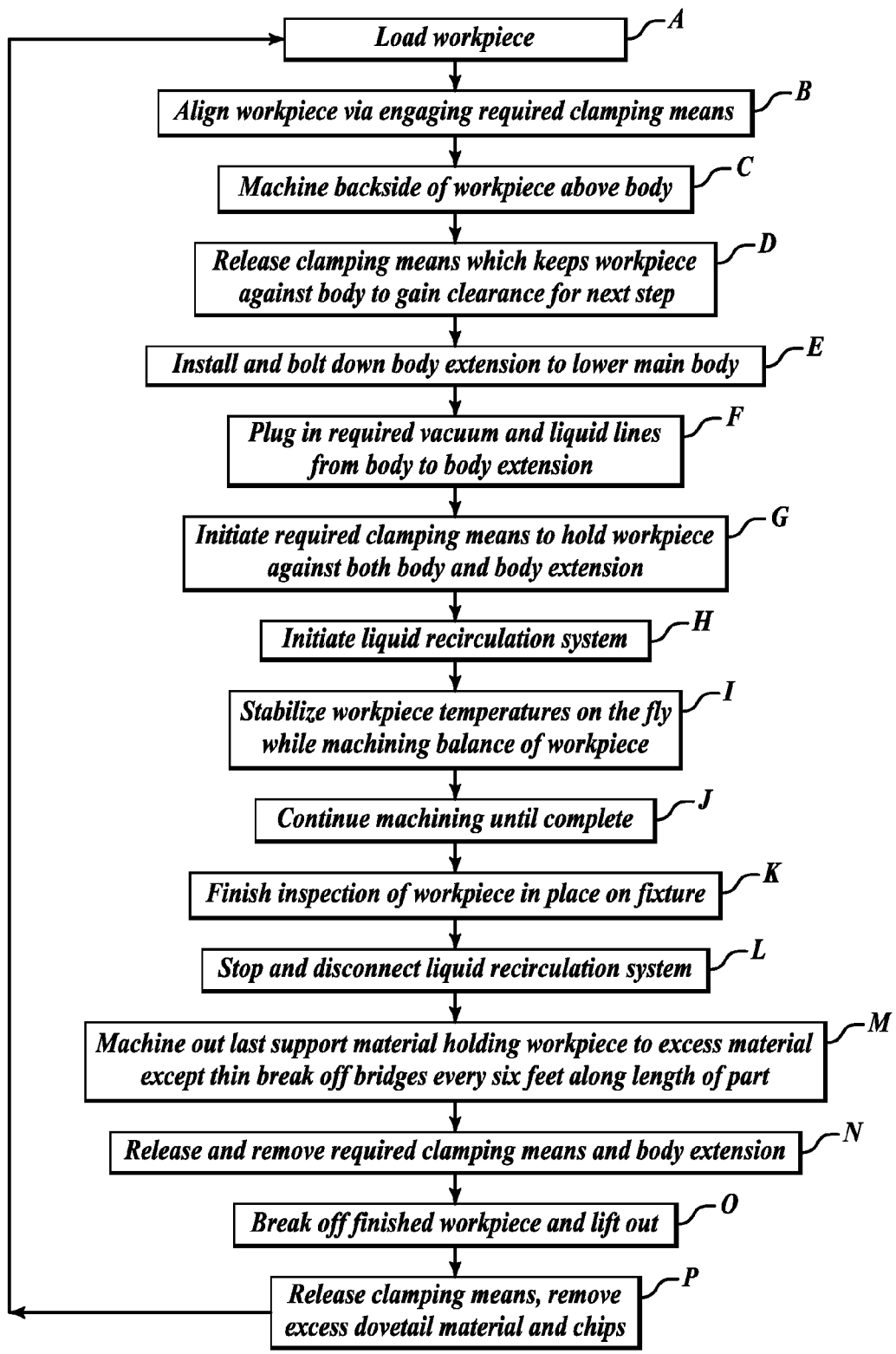
FIG. 3 is a flow chart showing a sequence of steps followed when a vertically oriented work piece is temperature-stabilized during a machining and dimension inspection cycle in accord with the inventive method.
Figure 4:
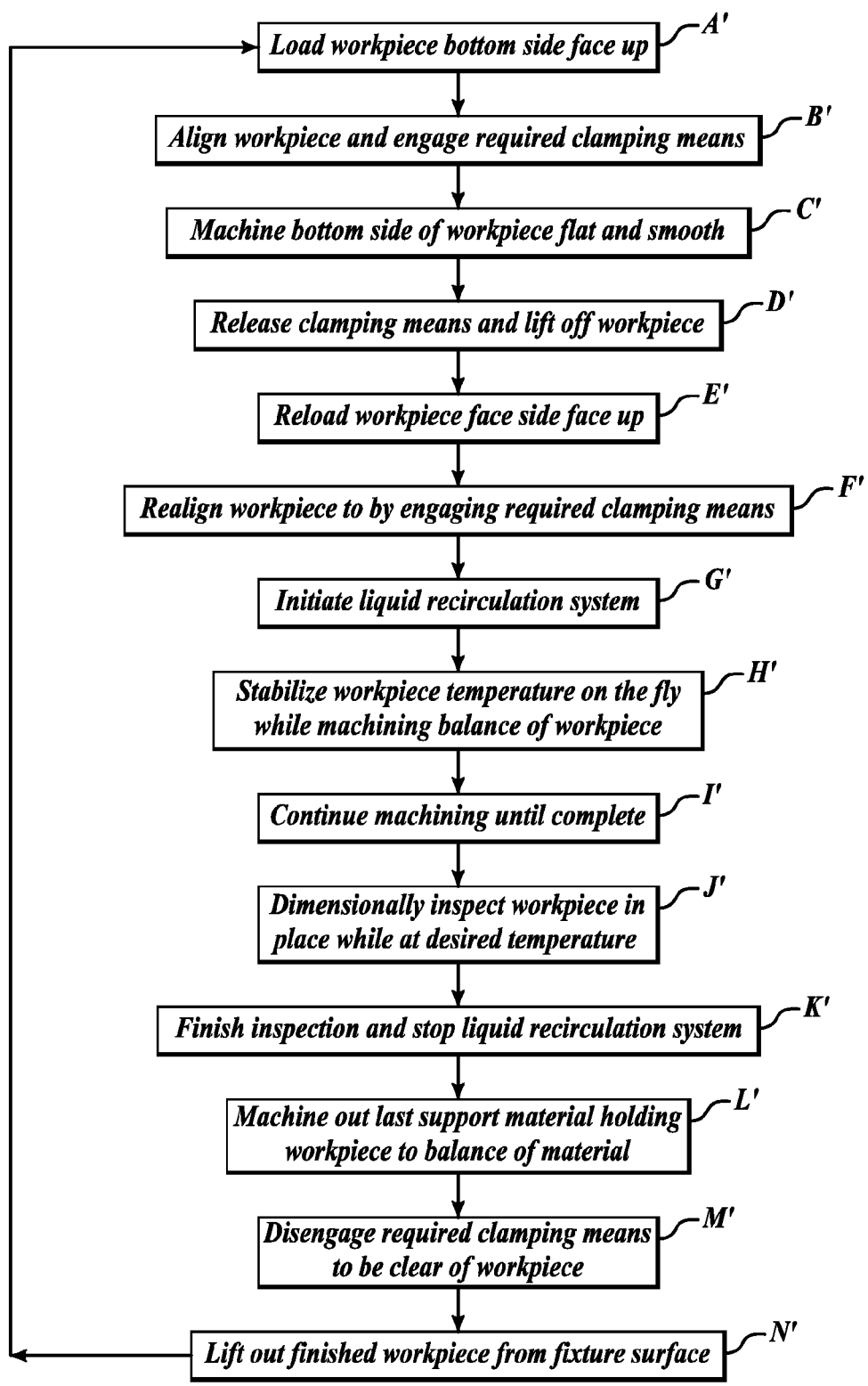
FIG. 4 is a flow chart showing the sequence of steps followed when a horizontally oriented work piece is temperature stabilized during a machining and dimension inspection cycle in accord with the inventive method.

In operation, the method in accord with the present invention for machining vertical surfaces of an L-shaped extruded aircraft aluminum work piece 32, is shown by way of example by reference to FIGS. 1A, 1B and 2, for the apparatus, and FIGS. 3 and 4 for the method steps.

As a preparatory step, the back surface 32c (Steps A-C) and/or the bottom surface 32b (see also FIG. 4) of the work piece 32 is/are machined flat to serve as the reference datum surface(s) for machining the rest of the surfaces. This reference machining may be performed non-isothermally, but upon isothermal cooling/heating, these flat surfaces become Stabilized Surfaces, as defined above. The "as extruded" surface dimension of the L-shaped work piece 32 is not accurate enough to act as the reference datum surface without being machined into specification. Also, one single size extrusion 32 is ordinarily milled into many different sizes of stringers. Thus, the surface 32c, upon machining will become the reference datum surface because it is held by the inventive fixture in a single-load position. Accordingly, surface 32c first has to be reference-machined.

Continuing on FIG. 3, Steps A-C, the work piece 32 is loaded and clamped in place to base 20 via the dovetail clamps 25, 30 which compress it against the heat transfer plates 27 and the resilient cylindrical seals 30 of the body 21. Next, vacuum pump 44 is turned on to draw the work piece 32 into the correct position against the body 21 via conduits 24. The lower half of the front surface 32d of work piece 32 is now finish machined to appropriate configuration and highly precise specifications to become the reference dimension for all subsequent machining.

The vacuum hold down is turned off or released, Step D. A body extension 22 is placed on top of the body 21 to facilitate bolting to the body 21, Step E. Both the body 21 and the body extension 22 have a plurality of matching, integral counter sunk through holes 23 placed at regular intervals along their length to maximize a rigid mechanical joint. A number of bolts (not shown) are inserted through these countersunk through holes 23 and tightened into matching nuts 23a installed in the body 20. The front face of the body extension 22 extends the dimensional datum plane of the body 21. Vacuum is now additionally routed via vacuum lines to a plurality of vacuum conduits 24 integral to the body extension 22. The vacuum pump 44 is restarted to draw the reference dimension surface of the work piece 32 tightly against the dimensional datum plane of the body extension 22 for the balance of the machining cycle, Step F. The clamps are secured, Step G. Circulation pump 45 in fluid system 16 is turned on to continuously re-circulate the high thermal conductivity fluid 28 while the remaining machining and "on-machine inspection" is performed without moving the work piece 32, Step H, FIG. 3.

In Step I, as the thermal energy from the machining process starts to heat the work piece 32, the temperature sensing device 29 registers a corresponding temperature rise. The T-increase signal from the temperature sensing device 29 is connected remotely to the MPC, "the controller", that provides an output signal to the heater/chiller 40 to initiate cooling and pumping of the high thermal conductivity fluid 28 through the manifold lines 47 and the channels 26. As the work piece 32 temperature progressively rises higher above +1.0° F. over the 68.0° F. set point temperature, the controller signals the heater/chiller 40 to progressively lower the temperature of the high thermal conductivity fluid 28 and/or increase the cooling fluid flow rate. With a temperature differential between the warmer work piece 32 and the cooler heat transfer plate 27, thermal energy flows from warmer to cooler, conducting thermal energy away from the work piece 32. This process continues until an equilibrium is reached where the flow of thermal energy out of the work piece 32 equals the flow of thermal energy out of the heater/chiller 40 condenser coil to atmosphere.

In Step J, as the machining process moves from roughing to finishing passes, much less thermal energy is generated by the cutter so the flow of thermal energy into the work piece 32, progressively tapers off. Simultaneously, thermal energy continues to flow from the still warm work piece 32 to the cooler heat transfer plate 27, to the cooler thermal radiator elements 43 to the heater/chiller 40 until the temperature of the work piece 32 moves below the +1.0° F.-above-set point. At this point, the temperature of the high thermal conductivity fluid 28 circulating through the fluid conduits 26 and past the heater/chiller 40 is almost equal to the temperature of work piece 32 which equals almost a zero differential temperature, thereby progressively minimizing transferring thermal energy. At this point, all machining is finished but the closed loop liquid recirculation system 16 continues to circulate isothermal fluid at 68° F. from the heater/chiller 40 to maintain the temperature of work piece 32 isothermal while it is inspected.

In Step K, after the work piece 32 passes inspection, the closed loop liquid recirculation system 16 pump is shut off, Step L. The final cut-off pass is made which almost separates the work piece 32 from the excess dovetail material, Step M. The vacuum pump is shut off, the body extension 22 is unclamped and removed, Step N, and the work piece 32 is broken-off from the remaining dovetail supporting it, Step O. The excess dovetail stock left over is unclamped and removed along with any remaining chips, Step P.

The operations method for a horizontal work piece is shown in FIG. 4. In Step A', the bottom side of the work piece 32 is machined flat to serve as the reference datum surface for all subsequent surfaces to be machined. The blank work piece 32 is loaded flat on top of the work holding system with the bottom side face up. The position of work piece 32 is then aligned by tightening appropriately placed side clamps, Step B'. Next vacuum pump 44 is turned on to draw the work piece 32 tightly against the heat transfer plates 27. The now upwardly facing "bottom" side is machined flat, straight and smooth, Step C'. The vacuum pump 44 is turned off, the side clamps are released and the work piece is lifted off of the work holding system, Step D'. The work piece 32 is reloaded face up, Step E', with the flat straight smooth bottom face touching the holding body 21. The work piece 32 is then realigned by retightening the side clamps, Step F'. The vacuum pump 44 is turned back on. In Step G', the circulation pump 45 is turned on to continuously cool the work piece during the machining and inspection cycles are performed without moving the work piece 32. The temperature control and machining sequence(s) described above in reference to FIGS. 1-3 are now repeated as Steps H'-N'.

The inventive isothermal work holding system is capable of stabilizing work piece temperature on the fly by heating or cooling, as needed, while machining, as seen in the flow-charts of FIG. 3, Steps J-P and FIG. 4, Steps I'-N'. The temperature of the work piece, the entire machine base, and work piece holding fixtures can be controlled to prevent unwanted condensation on parts. Normally, the 68° F. temperature is not cold enough to cause significant condensation to form, but in extreme humidity conditions or/and high relative humidity, the set point temperature can be raised to prevent or reduce condensation that might interfere with operations. In the alternative, dehumidifiers may be used adjacent the machining operations. Ordinarily, the system reaches thermal equilibrium at or very near the ideal set point temperature of 68.0° F.

A further advantage and function of the inventive work piece holder system is to quickly damp out work piece 37 vibrations which cause chatter. The holder base 20, body 21 and body extension 22 are most preferably formed from a rigid material having a high damping property. The currently preferred polymer concrete material is exemplary of a material having the required properties, but that is not intended to be the sole, and therefore limiting, material. A suitable polymer concrete is available from ITW/Philadelphia Resins Corporation, Montgomeryville, Pa. Similar formulations under the generic category of polymer concrete are sold under various trade names, including PolyCAST. One skilled in this area will recognize this class of material as having been used in bases and support structures for machine tools, precision inspection machines, optical tables, semi-conductor laser lithography equipment supports, and benches for laser optics and high energy optical research. However, heretofore they have not been used as support bodies for and directly in contact with work pieces. The preferred class of polymer concretes can be cast into a wide variety of shape configurations in the same manner as zero slump concrete, as long as volume and weight are not a constraint. In compression loading (but not in tension), it has a compressive strength similar to dense, fine-grained Meehanite cast iron.

Alternative clamping systems may be utilized in the present invention, e.g., integral locator pins may be used in conjunction with mechanical clamps in accordance with the invention for holding work pieces. Or, locator pins may be used in conjunction with vacuum hold downs, or any combination of these alternatives.

SECOND EMBODIMENT, APPLICATION TO MACHINING AND ASSEMBLING AEROSPACE WING SPARS

In this second embodiment of the invention, as step one (referring to FIGS. 1-4), all the work pieces, including the wing spar chords 50 and the wing webs 52, are consistently machined by the inventive vibration damping, isothermal work piece holding system.

Figure 5:
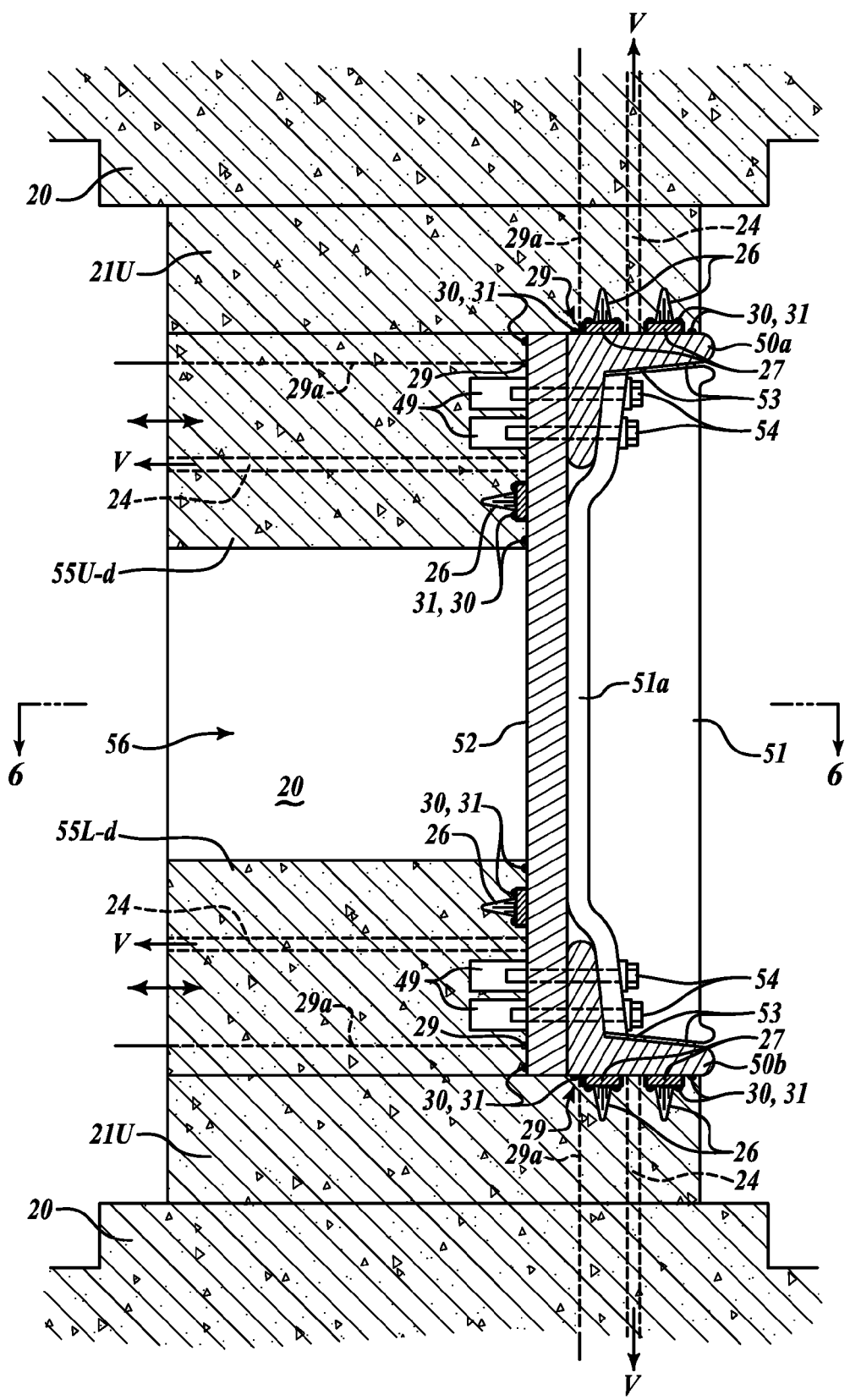
FIG. 5 is vertical section view of a third, alternate embodiment of the present invention in its isothermal assembly aspects taken along lines 5-5 in FIG. 6 showing a work holder with upper and lower moveable extension elements maintaining a vertical web in orientation for assembly to spar chords and ribs.
Figure 6:
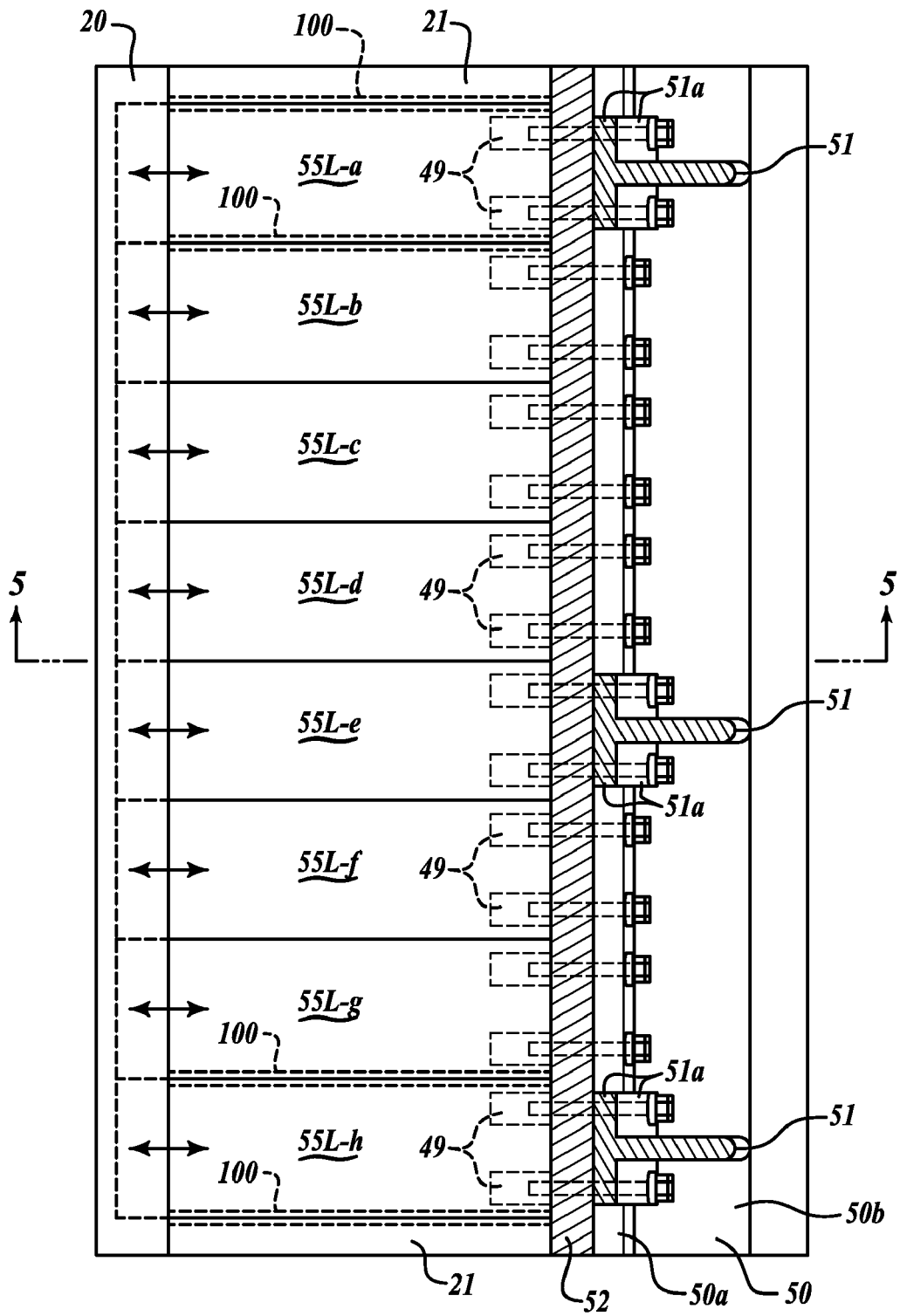
FIG. 6 is a horizontal section view of the third, alternate embodiment of FIG. 5 taken along the line 6-6 in FIG. 5 showing a work holder with moveable extensions in both retracted and extended positions.

In FIGS. 5 and 6, an inventive holding system is configured as an isothermal assembly fixture to maintain accurate mechanical alignment of each individual web 52 to spar chords 50a, 50b and the rib posts 51 with flanges 51a, while the temporary fasteners 54 are automatically installed by an automated rivet machine (not shown). Fewer than the usual number of temporary fasteners 54 are tensioned to hold the posts to the web and spars. Note the spar chords 50 a, b and the web 52 are secured by the vacuum channels, and cooled by the thermal cooling system 26, 27 in the upper and lower work piece holding bodies 21U, 21L and the moveable work piece back supports 55. This inventive assembly apparatus maintains the work pieces isothermal and in precise alignment regardless of nominal ambient temperature variations. The vibration damping property of the polymer concrete inherently provides accurate, repeatable tensioning of the fasteners by the automated rivet machines. This embodiment eliminates on the order of 95% or more of the nominal CTE expansion changes caused by the ambient temperature deviations.

Accordingly, an additional advantage of this embodiment of an isothermal work piece assembly fixture system and method is the elimination of an estimated 80% of the costs of manually installed temporary tack fasteners and their problematic, imprecise manual removal.

Specifically, a wing web 52 is held in precise vertical alignment against two, spaced, upper and lower, wing spar chords 50a, 50b which are also held in alignment with wing rib posts 51 and its flanges 51a, spaced apart down the length of the wing Main work holding bodies 21U and 21L, are located along the upper and lower marginal edges of the wing web 52 to maintain the chord members 50a, 50b in precise alignment. The work holder body elements 21U, 21L are secured in place by base 20, the inserts and bolts not being shown for clarity. A series 55L-a . . . 55-h (see FIG. 6) of horizontally movable work holding body elements 55U and 55L are secured to the end walls of the base 20, to themselves, and optionally, to the spanning upper or/and lower holding bodies 21U, 21L by sliders 100 (seen schematically in FIG. 6).

Preferably but optionally, in at least some of the sections of the holding body assembly 20, 21, 55 along the length of the wing web, a center access void 56 is provided. These moveable elements 55 may be full or partial height between the bodies 21U and 21L. These moveable sections 55U, 55L are located in places were access is needed to the back side of web 52 to permit access to the fasteners 54, and their retractability permits the re-quired access. The arrow with the letter V indicates connection of the vacuum conduits 24 to the vacuum system. A plurality of fluid conduits 26 having heat transfer plates 27 are located to be in contact with the work piece to cool or heat it, as needed. The coolant 28 is circulated through conduits 26 into contact with fins 43 and heat transfer plates 27 held in thermal contact with the respective wing spar chords 50a, 50b by vacuum. A plurality of seal elements and grooves 30, 31 are emplaced adjacent to the outer edges of the faces of the body 21 that contact the spar chords 50a, 50b.

A temperature sensor 29 measures the temperature of each top and bottom spar chord 50a, 50b, and its lead 29a is routed to the controller (not shown in this figure). Both of the upper and lower sections 55U, 55L of the holding body 21 are fitted with heavy duty, robust slide mechanisms (industrial strength drawer-type slides) cast in the bodies and in end walls of the body holder base 20. This allows the individual moveable back support 55 to maintain precise alignment with each holding body 21 but still translate in one axis (here horizontally) against the back side of the web 52 to support its position for subsequent operations. The front face of each moveable back support 55 has integral clearance voids or pockets 49 to allow fasteners to protrude into it without losing a vacuum seal when the fasteners 54 are installed.

An exemplary sequence of the inventive assembly method steps is as follows: All the moveable back supports 55 are retracted back from the reference plane to allow easy insertion of the web 52 against the top and bottom face of each holding body 21. Then, the moveable back supports 55 are moved into their precision-aligned positions and the vacuum applied to draw the web 52 against the faces of the moveable back supports 55. The coolant is pumped through the conduits 26. Next, the bottom spar chord 50a is placed into an aligned position against the lower back edge reference plane of the body 21 until it contacts the vacuum seal along the entire length, so that vacuum will draw the spar chord 50a firmly against the dimensional reference plane of the body 21a for the balance of the assembly cycle.

Without moving the bottom spar chord 50a, the previous four steps of the assembly sequence are now repeated for the top spar chord 50b. Next, every rib post 51, is installed with temporary fasteners 54, and peelable shims 53 may be used, as needed. After the precision bores in their final aligned position have been drilled and reamed, the clamp holding the rib post 51 is re-moved and the vacuum holding the spar chord 50a and 50b is released. This allows these work pieces to have a generous gap between them in preparation for the next step.

Then, these moveable back support(s) 55 is/are now extended forward and the vacuum is reapplied to reestablish the alignment of the web 52 in all sections of the assembly.

Referring now to FIG. 6, these last two steps are now repeated in sequence for the next adjacent individual moveable back support 55, starting with 55L-a and moving to every $3^{rd}$ or $4^{th}$ one 55L-c/d to 55U-h and so on sequentially for selected individual moveable back support 55U down the length of the overall assembly. The first set of moveable back supports 55 have their vacuum released and they are retracted. The automated assembly machine now reams all remaining open bores, inserts the fasteners, and then tightens all of the remaining fasteners 54 including those which hold the rib post 51 to the spar chords 50a, 50b in the first section. It also removes the last two tapered pins, reams the bores up to size and inserts the last two permanent fasteners 54 in that section. The first set of moveable back supports 55 are now extended forward and vacuum is reapplied to re-establish alignment. These last 5 steps are now repeated sequentially within each moveable back support 55 section down the length of the assembly. Finally, the circulation pump 45 and the vacuum pump 44 are both shut off, all vacuum is released, all of the moveable back supports 55 are retracted back out of the way and the completed assembly is removed out of the inventive isothermal vibration damping work holding system.

THIRD EMBODIMENT, APPLICATION TO MANUFACTURE OF AIRCRAFT SKIN PANELS

By way of background, historically, aircraft wings are assembled by fastening large, flexible, contoured exterior panels (called skins) to stringers by rivets. The whole operation is performed in three distinct stages.

In Stage 1, all the work pieces are manually loaded onto a work fixture, which holds all work pieces in approximate relative alignment, within ±0.030 of an inch on the Y axis and ±0.060 of an inch on the X axis. Assembly workers then manually drill holes to install the first 10-15% of all fasteners for emplacement of temporary fasteners (called tack fasteners) to attach each stringer to the wing skin.

During stage 2, the automated assembly operation begins. An automated rivet machine which utilizes a vision guidance system finds the location of a first tack fastener on the outside of the skin. The rivet machine uses this location as a reference point to adjust the position for drilling holes for the permanent fasteners along the stringer.

During stage 3, workers then move the semi-complete assemblies to a post staging area, where temporary tack fasteners are removed from the awkward, space-limited stringer side (wing interior). They manually insert and tension permanent fasteners in the previously-drilled tack fastener holes, but there is the common situation that an inexperienced or fatigued worker could damage the underside of the assembly. Such damage can be very costly, if not impossible, to rectify. Very expensive wing assemblies are routinely scrapped in stage 3, due to such type of worker errors.

Problems of stringer to skin misalignment are addressed and overcome by the invention in the form of an assembly fixture apparatus and method that accurately maintains alignment of all stringers to the skin panel while all fasteners are automatically installed. The invention eliminates misalignment of all the parts by maintaining all the work pieces isothermal regardless of nominal ambient temperature variation. Any remaining minor temperature deviations result only in miniscule TCE dimension changes. The vibration damping ability of the apparatus provides accurate, repeatable tensioning of the fasteners by the automated machines.

Figure 7:
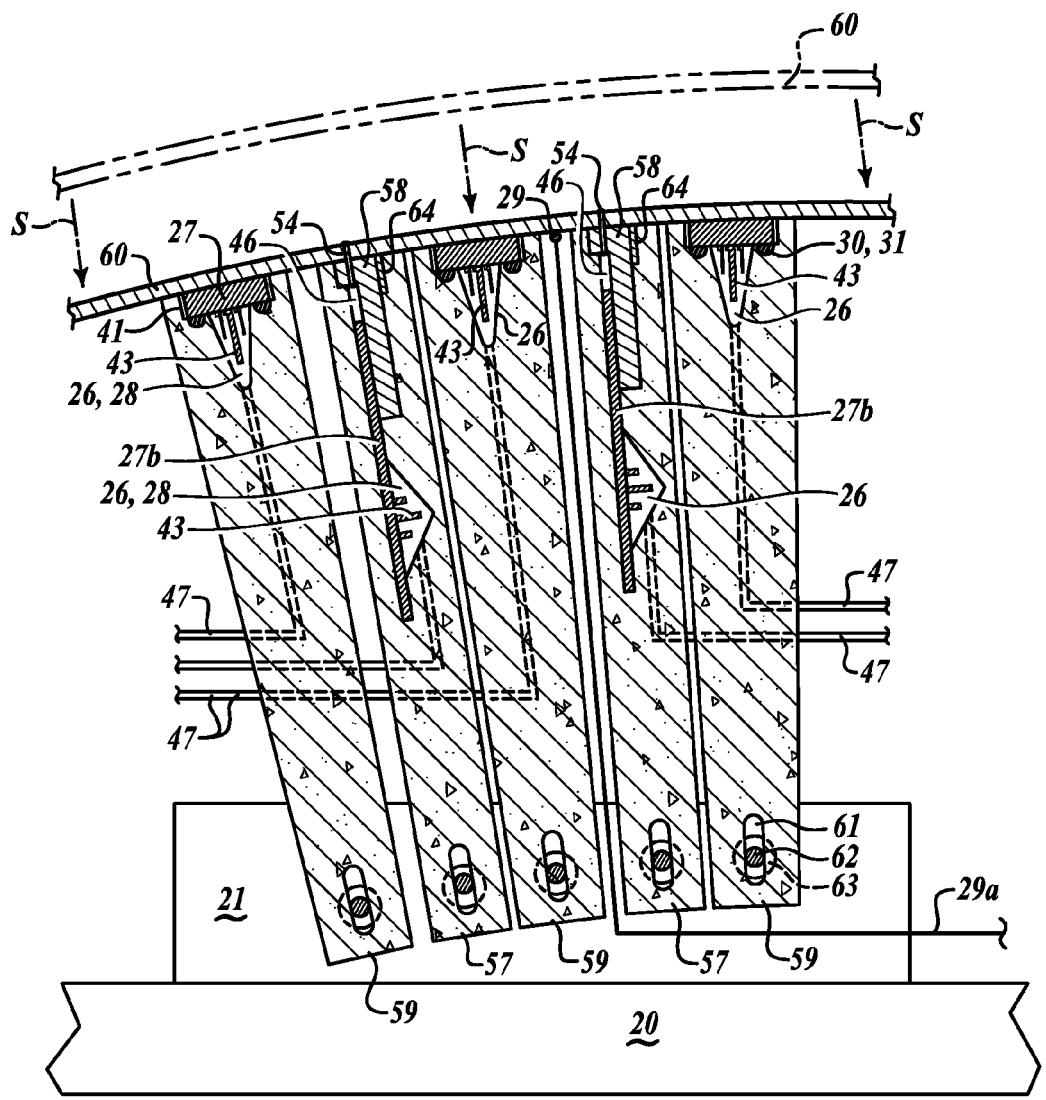
FIG. 7 is an end elevation view of a fourth, alternate embodiment of the present invention showing a plurality of horizontal stringers accurately aligned to a skin panel work piece via the work holder body, thermal energy transfer elements and internal vacuum lines.

FIG. 7 is an end elevation view of an inventive work piece assembly fixture for precisely securing wing skins to stringers, configured with stringer supports 57 that hold stringers 58 in a precise position, and an assembly of contoured skin supports 59 that hold the skin 60 in a generally horizontal position. Both of these supports are made of the polymer composite material described above for work piece holding bodies. As shown, there is a main structure, support or body 21 which precisely maintains the stringer supports 57 and skin supports 59 in alignment with respect to each other by means of a plurality of slots 61 (in the stringer and skin supports) and cross pins 62 that thread into inserts 63 emplaced or cast in and along the length of the holding body 21. The body holder base 20 is shown as supporting the work piece assembly holding body 21. One skilled in the art can easily implement a cantilevered or overhead suspension support assembly to maintain the body in any desired orientation. The individual slots 61 of each stringer support 57 and each skin support 59 are situated at different heights to follow the contour of a given individual section of the skin 60. The plurality of slots 61 each receive a threaded cross pin 62 that has shoulders to match the slot 61 width which screws into a threaded insert 63 cast or emplaced in the body 21 so that when the cross pin is tightened down, the stringer and skin supports 57, 59 are retained in proper alignment. A plurality of vacuum conduits 24 internal to the stringer support 57 and the skin support 59 are not shown due to the scale of the drawing. These vacuum conduits 24 are as above. A fluid conduit 26 in each stringer support 57 and skin support 59 is disposed in association with each heat transfer plate 27 situated in the top of the skin support 59 and near the top of the stringer support 57.

As before, the coolant cools stringer 58 and skin 60 as their weight bears on the plates 27. The physical location of the stringer support 57 and the magnetic position indicator 64, embedded within the stringer support 57, provide the precise orientation for positioning the automatic rivet machine to drill, insert and tension the majority of the temporary fasteners from the front side of the skin 60.

Note on each of the stringer supports 57, the heat transfer plates 27b are elongated to extend up one side of stringer 58 to assist in forcing the L-shaped foot of the stringer 58 against the back side of the skin 60 (which will be inside the wing when assembly is completed). The heat transfer plate includes a notch 46 coordinate with the location of a fastener (rivet) 54 that is emplaced by the automatic rivet machine, in order to provide clearance for the rivet head.

To maintain the skin in correct alignment with respect to the stringers, a plurality of cylindrical seal and groove assemblies 30, 31 are formed/emplaced in the outer edges of the top face of each skin support 59. The outer edges form a perimeter seal around the periphery of each heat transfer plate 27 on the face of the skin support 59. While optional, but not preferred, as essentially unnecessary, seal and groove assemblies to enable vacuum clamping to the stringers can be used for the stringer support 57. It is simpler and less costly to just mechanically clamp the stringers in place. A temperature sensing device 29 measures the temperature of the bottom side of the skin 60.

The steps of precision wing manufacture and assembly of skin 60 to stringers 58 are the following: The entire isothermal work holding assembly support structure including the precisely aligned stringer supports 57 and skin supports 59, is aligned by proper placement of the supports and tightening down the pins 62 in slots 61. Next, the coolant fluid is continuously circulated during the entire assembly operation via manifold pipelines 47 and channels 26. Each precision machined stringer 58 is placed against heat transfer plate(s) 27 and the top face of the stringer support 57. These steps are repeated for all of the stringers 58 needed for this assembly.

After all the stringers 58 are precisely in alignment, the skin 60 is carefully lowered onto the skin supports 59 as shown by Arrows S. With isothermally machined and cooled stringers 58 precisely abutting against the bottom surface of the temperature controlled skin 60, the automated rivet machine can now scan for the magnetic position indicator 64 mounted next to one edge of the stringer 58 through the skin 60. Magnetic position indicators 64 are sensed through the non-magnetic aluminum skin 60 from the front side of the skin. The magnetic position indicator 64 now serves as the absolute reference position for precise and repeatable alignment for drilling center line holes for the stringer pad fasteners. After precisely drilling the holes, the vision system of the automated rivet machine locates and installs permanent fasteners in each hole. Upon installing all fasteners and rivets, coolant/vacuum pump(s) are turned off. The completed wing section assembly is now moved to the next assembly station using a special lifting fixture.

FOURTH EMBODIMENT, APPLICATION TO MAINTAIN STEEL MACHINE BED ISOTHERMAL

Historically, the bed and structural frame of machine tools have been constructed from various combinations of cast iron, steel forgings and sheet steel and polymer concrete for the support base of new small machines. However, for very large or very long machines especially those from 30 to 200 feet in length, the usual material for the bed and the structural frame has been sheet steel. However, any steel machine bed or machine column transmits vibrations from the tooling to the work piece very effectively. The TCE of steel is relatively high, although only about half that of aerospace aluminum alloys. If the temperature of a long steel structure such as a machine bed changes due to changes in ambient air temperature, this will affect the length and hence the absolute repeatable accuracy of the machine.

This $4^{th}$ embodiment of the invention comprises a work piece holding apparatus assembly and method that maintains the steel bed of the machine isothermal regardless of nominal ambient temperature variation to provide repeatably accurate dimensions. The vibration damping function of the inventive apparatus also helps to create smoothly machined work piece surfaces.

Figure 8:
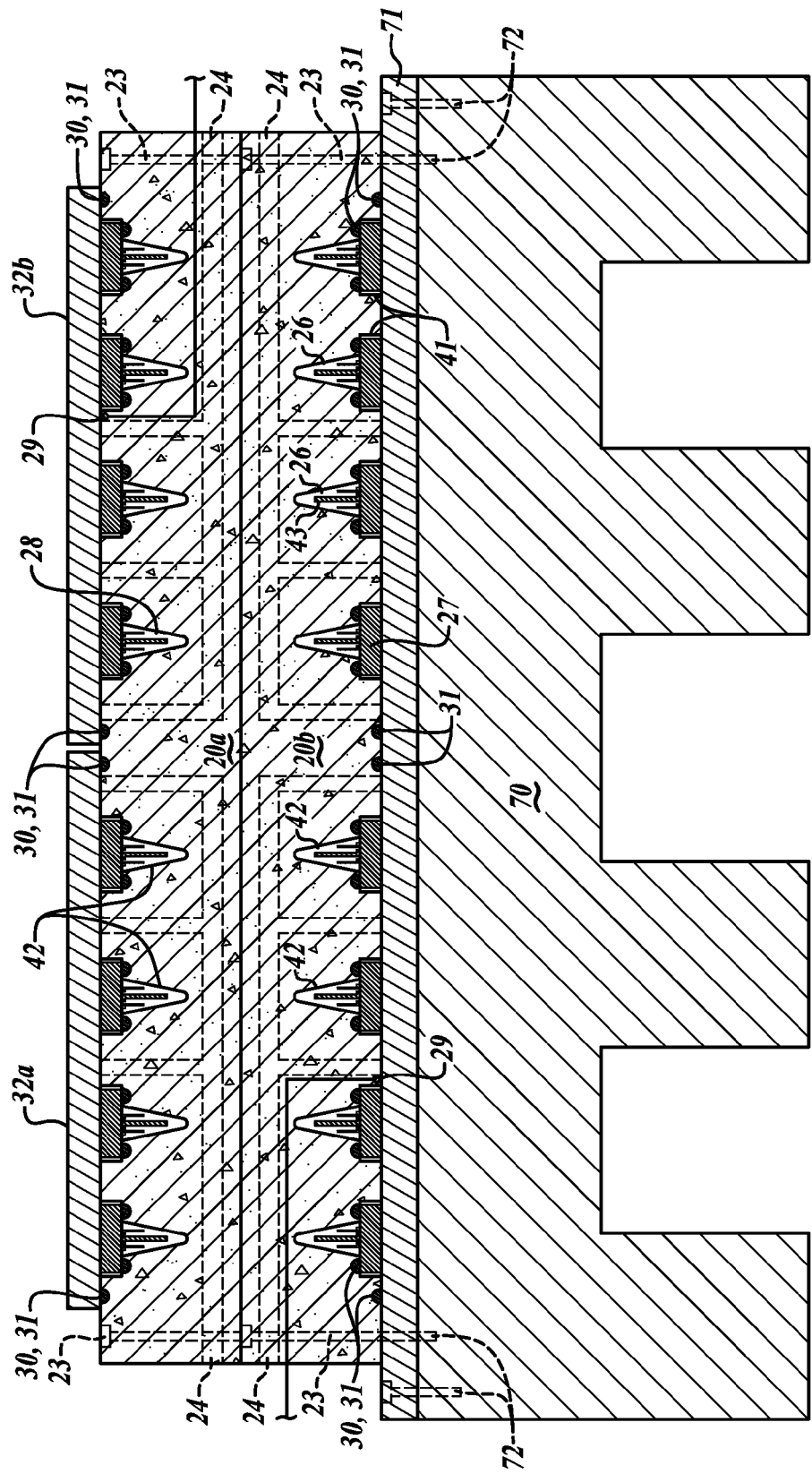
FIG. 8 is a end elevation view of a fifth, alternate embodiment of the present invention showing a machine bed having an inverted thermal energy transfer assembly such that the bed of the machine is maintained isothermal and it supports an alternate embodiment of the present invention which supports the work piece.

FIG. 8 is an end view showing a internal cross section of a typical horizontal sheet steel bed 71 of a vertical spindle gantry style milling machine. The upper gantry, spindles, etc., have been omitted for clarity. Two individual and separate work holding systems stacked one on top of each other with the bottom system inverted, upside-down. These are bolted to each other and to sheet steel bed 71. A first, lower body holder 20b, is the inverted body. A plurality of heat transfer plate 27 forming the capping face of the triangular shaped channels 42 are now in thermal contact with the sheet steel bed 71 of a vertical spindle gantry style milling machine. The heat transfer plate 27 are located so as to be directly between existing bed bolt holes 72 to maximize thermal transfer to and from the sheet steel bed 71 mounted on machine frame/support 70.

The body 20b serves as a first, lower isothermal and vibration damping system. The countersunk through holes 23 are strategically placed to bolt it to the bed 71. A single temperature sensor 29 is placed at approximately the center to monitor the temperature of the bed 71. Additionally, there are also a plurality of suitably located vacuum conduits 24 and outer resilient cylindrical seals 31 in the bottom face to help secure the body into thermal contact with bed 71.

The second, upper isothermal vibration damping system body 20a is essentially a copy of the lower body 20b, but oriented right side up. It includes a plurality of countersunk through holes 23 and the usual vacuum conduits 24, and heat transfer plates 27 to hold and contact the work pieces 32a, 32b. Thus the upper and lower bodies 20a, 20b are bolted together to act as single, rigid work piece holder on an isothermal machine bed 71.

FIFTH EMBODIMENT, APPLICATION TO ISOTHERMAL COOLING OF A LINEAR INDUCTION MOTOR

Historically, machine tools are moved linearly by electric rotary or linear motors. Since they are current operated, linear motors suffer from electrical, $I^2R$ thermal loss, which generates waste heat conducted into the frame of the machine tool. The amount of heat generated is related directly to how much current is flowing through the motors. A large machine tool can easily require 6-10, 2.5 KW motors to move large gantrys weighing up to 90,000 lbs, and they generate a total of 40,000 BTU of waste thermal heat. This waste heat thermally distorts the frame of the machine, which in turn degrades the repeatable accuracy via TCE induced thermal growth of the machine. The 5th embodiment of the inventive vibration damping, isothermal work holding sys-tem intercepts the waste heat that flows from the electromagnets of the linear motor into the frame of the machine, and preserves the absolute accuracy of the machine alignment.

Figure 9:
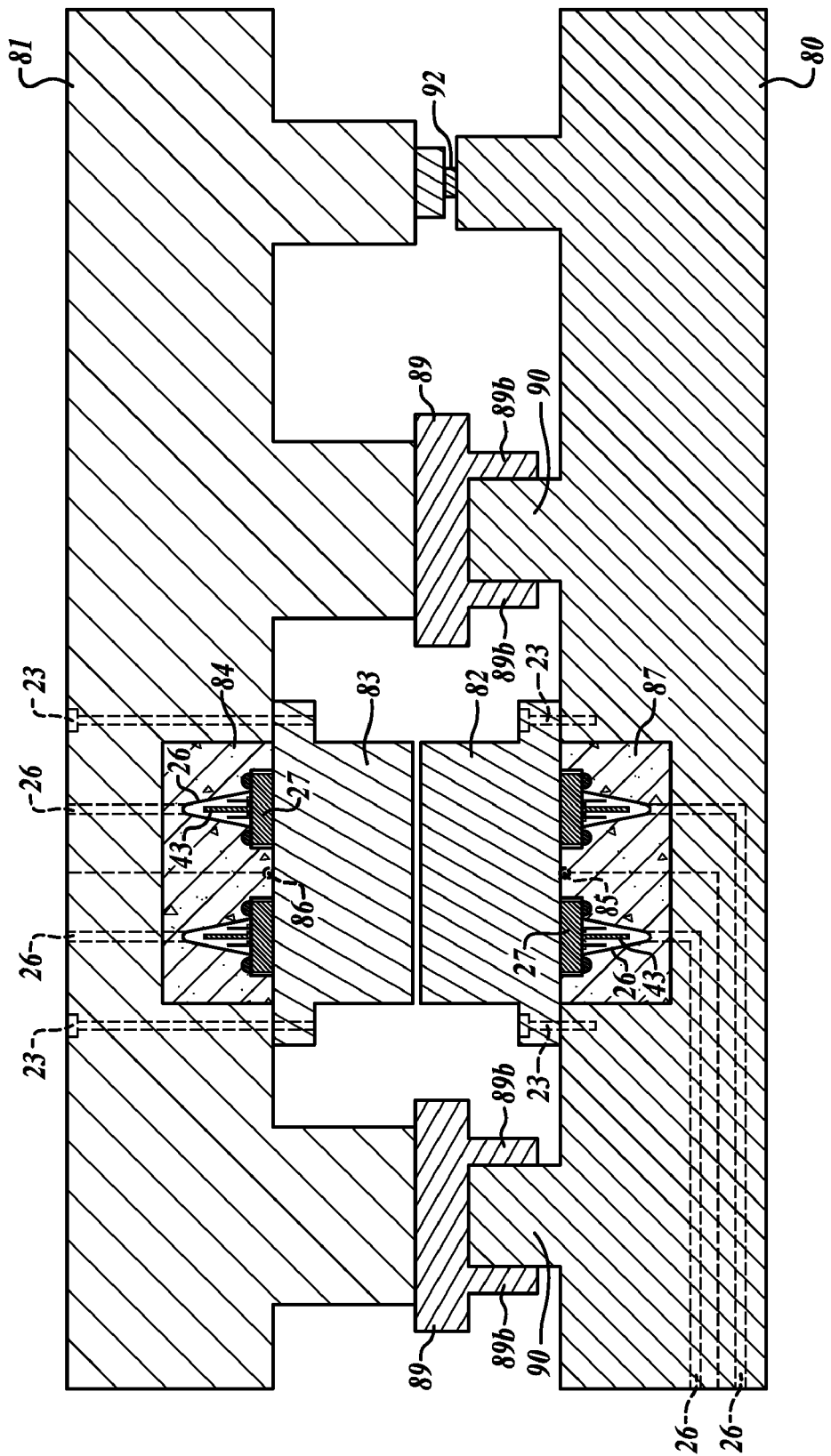
FIG. 9 is an end elevation view of a sixth, alternate embodiment of the present invention showing the thermal energy transfer elements adjacent to both top and bottom halves of a linear induction motor.

FIG. 9 is an end elevation view showing a detailed internal cross section of a typical linear motor fabricated within the frame of a machine axis. In a conventional linear motor application, the bottom half machine frame 80, supports fixed linear rails 90. The linear rolling glide blocks 89 roll on top of and are held captive to the fixed linear rail 90 by side flanges 89b. The top half machine frame 81 is supported by bolting, via counter-sunk through holes 23, to the top of the linear rolling glide block 89 on both sides. A magnetic linear encoder 92 provides both position and velocity data of the top half machine frame 81 with respect to the bottom half machine frame 80. In normal operation, both the bottom linear motor magnets 82 and the top linear motor magnets 83 give off waste heat. Depending on the configuration of the linear motor, one of 82 or 83 is a permanent magnet unit and the other is an electromagnet.

In this embodiment, a top and bottom thermal transfer systems 84, 87 are disposed in intimate thermal contact with the top and bottom linear motor magnets 83, 82 respectively. Top and bottom temperature sensors 86, 85 monitor the temperatures of both sets of magnets. As the waste heat generated by the magnets increases their temperatures, the heat transfer plate 27 conducts waste heat to the thermal radiator element 43, which in turn conducts heat in to the high thermal conductivity fluid 28. This waste heat is transferred via the fluid conduits 26 to the closed loop circulation system 16 to the heater/chiller 40 where the waste heat is transferred to an external air vent outside the building (see FIGS. 1A, 1B).

INDUSTRIAL APPLICABILITY

It is clear that the inventive vibration damping, isothermal work piece holding systems and methods will have wide applicability in industry, particularly the aerospace and precision equipment manufacturing fields, as they provide a system for dry machining without liquid coolant contacting the work piece, minimizes work piece chatter, minimizes height differences between adjacent tool passes, which in turn minimizes the concentration of stress that is the machining-induced root cause of stress corrosion cracking and corrosion-fatigue, both of which have the potential for inducing catastrophic failure. Various modifications within the scope of this invention can be made by one of ordinary skill in the art without departing from the spirit thereof and without undue experimentation. This invention is therefore to be defined by the scope of the appended claims as broadly as the prior art will permit, and in view of the specification if need be, including a full range of current and future equivalents thereof.

Parts List
This parts list is provided as an aid to Examination and may be cancelled upon Allowance of the case.

10 Inventive System
12 Holding Body System
14 Vacuum Mechanical Clamping System
16 Closed Loop Thermal System
20 Body Holder Base
21 Holding Body
22 Body Extension
23 Bolts Countersunk through Holes
23a Threaded Inserts
24 Vacuum Conduits
24a, b, c, d, e Vacuum Manifold Assembly
25 Dovetail Clamping Bar
26 Fluid Conduits (V-shaped channels)
27 Heat Transfer Plate; 27a Outer face of HTP;
27b HTP extension to support Stringer
28 High Thermal Conductivity Fluid
29 Temperature Sensing Device
29a Leads
30 Resilient Cylindrical Seal
30a, b, c Cylindrical seal set
31 Cylindrical Seal Groove
31a, b, c Groove set
32 Workpiece; 32a Leg portion; 32b Dovetail end; 32c Workpiece face; 32d Workpiece opposite face
33 Bolt
34 Cylinder
35 Shaft
36 Spherical Joint
37 Pivot Joint (boss)
38 Bracket
39
40 Heater/Chiller
41 Parallel Square Shoulders
42 Rounded Apex of V-channel
43 Thermal Radiator Element (Fins)
44 Vacuum Pump
45 Circulation Pump
46 Notch in HTP to provide rivet clearance
47 Liquid Transfer Line
49 Pockets
50 Spar Chord; 50a Upper Wing; 50b Lower Wing
51 Rib Post; Contoured Flange 51a
52 Web
53 Shims
54 Fasteners
55 Movable Work pieceBack Supports
56 Center Access Void
57 Stringer Support
58 Stringer
59 Skin Support
60 Skin
61 Slots
62 Cross Pins
63 Inserts
64 Magnetic Position Indicator
65 Skin support air Bags
66 Skin Support air Bags
70 Steel Base
71 Sheet Steel Bed
72 Existing Bed Bolt Holes
80 Bottom Half Machine Frame
81 Top Half Machine Frame
82 Bottom Linear Motor Magnets
83 Top Linear Motor Magnets
84 Top Thermal Transfer System
85 Bottom Temperature Sensing Device
86 Top Temperature Sensing Device
87 Bottom Thermal Transfer System
89 Linear Rolling/Glide Block
89b Glide Block Flanges
90 Fixed Linear Rail
91 Linear guides
92 Magnetic Linear Encoder
95 Model Predictive Controller
96 Summing junction -continued Parts List
This parts list is provided as an aid to Examination and may be cancelled upon Allowance of the case.

100 Sliders for movable work piece back support 55
102 bolts

The invention claimed is:

1. An isothermal, vibration damping work holder apparatus for precision dry machining of work pieces, in a machine tool having a base and a datum bed of high Thermal Coefficient of Expansion (TCE) material, while reducing vibration-induced inaccuracies or defects, for precision assembly of high TCE parts requiring mechanical fastening components, and for maintaining the bed of said machine tool both substantially isothermal with reduced vibration propagation, comprising in operative combination:

a) at least one vibration-damping, low thermal conductivity, low Thermal Coefficient of Expansion (TCE) polymer composite material work holding body member configured for accurate, rigid structural support of work pieces for dry machining, assembly, or for support of a machine tool bed;

b) a work piece holding system comprising at least one of vacuum conduits provided in said work holding body, and mechanical clamping elements, for securely retaining in proper position at least one work piece while being dry machined or assembled;

c) at least one channel for passage of heat conductive fluid there-through provided in said work holding body on a face thereof that mates with at least one face of said work piece or said machine tool bed;

d) at least one heat transfer plate made of high thermal conductivity material provided in association with said channel disposed to be maintained in intimate thermal contact with at least a portion of said work piece, or said machine tool bed to maintain said work piece or said machine tool bed substantially isothermal while reducing error-inducing vibration propagation.

2. A work holder apparatus as in claim 1 which includes a datum bed of a machine tool mounted in association with a body of said polymer composite material, and said bed is maintained substantially isothermal by at least one first heat transfer plate disposed in intimate thermal contact with said bed and said polymer composite material reduces vibration propagation.

3. A work holder apparatus as in claim 2 wherein at least one work holding body is mounted on said machine tool bed to support a work piece, said body being intermediate said bed and said work piece to damp vibrations of machining operations on said work piece, said work piece being in thermal contact with at least one second heat transfer plate so that heat is not conducted between said bed and said work piece and said work piece is maintained substantially dimensionally stable.

4. A work holder apparatus as in claim 1 which includes a fluid circulation pump to circulate heat conductive fluid through said channel, a heating and cooling device for heating or cooling said fluid, a temperature sensor disposed in association with at least one face of said work holding body and a control system for maintaining said work piece or said machine tool bed at a pre-selected, substantially isothermal temperature value.

5. A work holder apparatus as in claim 4 wherein said heat transfer plate is made from copper or aluminum.

6. A work holder apparatus as in claim 5 wherein said heat transfer plate includes at least one fin element projecting into said channel to increase the surface area in contact with said fluid to efficiently transfer thermal energy rapidly to or from said fluid.

7. A work holder apparatus as in claim 2 wherein said heat transfer plate is seated in shoulders in said body along the marginal edges of said fluid channel.

8. A work holder apparatus as in claim 7 which includes seal members disposed in association with said fluid channels to assist in preventing leakage of heat transfer fluid out of said fluid channels.

9. A work holder apparatus as in claim 4 wherein said polymer composite material is a polymer concrete having the property of high strength and low vibration propagation.

10. A work holder apparatus as in claim 4 wherein said body member is modular and comprises at least one component to provide accommodation for work pieces of different sizes or shapes.

11. A work holder apparatus as in claim 10 wherein said vacuum holding system includes seal members received in corresponding seal grooves provided in said body member.

12. A work holder apparatus as in claim 11 which includes mechanical clamping elements.

13. A work holder apparatus as in claim 11 wherein said body member is configured to hold a work piece in at least one position of a plurality of axial orientations, including vertical, horizontal, and at an angle to the horizontal or vertical, to permit machining or assembly of work pieces in at least one of said orientations.

14. An isothermal, vibration damping insert for cooling a fixed or traveling component of a linear induction motor for a machine tool apparatus to reduce thermally-induced machine dimension growth that introduces errors in accuracy of machining work pieces by tools powered by said machine tool, comprising in operative combination:
   a) at least one vibration-damping, low thermal conductivity, polymer composite body member configured as an insert in a fixed bed or traveling element of a linear motor;
   b) at least one channel for passage of heat conductive fluid there-through provided in said insert body on a face thereof that mates with at least one face of said linear motor component;
   d) at least one heat transfer plate made of high thermal conductivity material provided in association with said channel disposed to be maintained in intimate thermal contact with at least a portion of said linear motor component so that heat generated by said motor is conducted to said fluid, thereby preventing heat migration to the machine tool bed or traveling member.

15. A method of dry machining or assembling work pieces comprising the steps of:
   a) loading a work piece into a vibration-damping, low thermal conductivity, low thermal coefficient of expansion, polymer composite work holding body member configured for accurate, rigid structural support of said work piece for dry machining, or assembly to at least one other work piece;
   b) clamping said work piece in properly aligned position for said machining or assembly by applying a vacuum to draw said work piece into intimate thermal contact with at least one face of said work holding body; and
   c) maintaining said work piece substantially isothermal by heat transfer out of or into said work piece by at least one heat transfer plate provided on the face of said body in intimate thermal contact with said work piece and in communication with a heat transfer fluid, said clamping by said vacuum assisting in maintaining said intimate thermal contact between said work piece and said heat transfer plate; and
   d) whereby Thermal Coefficient of Expansion (TCE) and vibration induced dimensional errors are reduced to permit more accurate machining or assembly of said work piece.

16. A method as in claim 15 which includes the steps of:
   a) clamping said work piece to said body using mechanical clamping members;
   b) circulating a high thermal conductivity fluid through fluid channels in communication with said heat transfer plate; and
   c) sensing the temperature of said work piece to provide a signal to a controller which controls a heater/cooler to heat or cool said high thermal conductivity fluid to bring to and maintain the temperature of said work piece at a pre-selected set point temperature.

17. A method as in claim 16 wherein the method is applied to aircraft assembly including assembly of webs to spars and posts, skins to spars and stringers, and body ribs to skins.

18. A method as in claim 16 which includes the steps of:
   a) mounting a bed of a machine tool on a body of said polymer composite material to reduce vibration propagation; and
   b) maintaining said bed substantially isothermal by heat transfer out of or into said bed by at least one heat transfer plate provided on the face of said body in intimate thermal contact with said bed.

19. A method as in claim 18 which includes the steps of:
   a) circulating a high thermal conductivity fluid through fluid channels in communication with said heat transfer plate; and
   c) sensing the temperature of said bed to provide a signal to a controller which controls a heater/cooler to heat or cool said high thermal conductivity fluid to bring the temperature of said bed to a pre-selected set point temperature and to maintain said bed substantially at said temperature.

20. A method of controlling thermally-induced dimensional changes in machine tools having tool holders that move relative to a machine bed, which movement is powered by a linear induction motor having a fixed and a movable component, comprising the steps of:
   a) providing a vibration-damping, low thermal conductivity, low Thermal Coefficient of Expansion (TCE) polymer composite member configured as an insert body in said fixed component or in association with said movable component of said linear induction motor;
   b) providing in at least one face of said insert body at least one channel for passage of heat conductive fluid there-through;
   c) providing at least one heat transfer plate made of high thermal conductivity material in association with said channel disposed in intimate thermal contact with at least a portion of one of said linear motor components; and
   d) circulating a heat conductive fluid through said channel in contact with said heat transfer plate so that heat generated by said motor is conducted to said fluid, thereby preventing heat migration to the machine bed or moving tool holder.

* * * * *